United States Patent
Kim

(10) Patent No.: US 10,909,849 B2
(45) Date of Patent: Feb. 2, 2021

(54) VEHICLE DRIVING ASSISTANCE DEVICE AND PARKING CONTROL SYSTEM INCLUDING SAME

(71) Applicant: LG INNOTEK CO., LTD., Seoul (KR)

(72) Inventor: Dae Hun Kim, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 0 days.

(21) Appl. No.: 16/307,862

(22) PCT Filed: Jul. 7, 2017

(86) PCT No.: PCT/KR2017/007325
§ 371 (c)(1),
(2) Date: Dec. 6, 2018

(87) PCT Pub. No.: WO2018/009038
PCT Pub. Date: Jan. 11, 2018

(65) Prior Publication Data
US 2019/0213883 A1  Jul. 11, 2019

(30) Foreign Application Priority Data
Jul. 7, 2016  (KR) .......... 10-2016-0086411

(51) Int. Cl.
*G08G 1/14* (2006.01)
*G08G 1/04* (2006.01)
(Continued)

(52) U.S. Cl.
CPC .......... *G08G 1/141* (2013.01); *B62D 15/028* (2013.01); *G06Q 50/30* (2013.01); *G08G 1/005* (2013.01);
(Continued)

(58) Field of Classification Search
CPC .......... G08G 1/141; G08G 1/017; G08G 1/04; G08G 1/005; G08G 1/14; G06Q 50/30;
(Continued)

(56) References Cited

U.S. PATENT DOCUMENTS 4,025,791 A * 5/1977 Lennington .......... G01S 17/74
250/341.1
4,207,468 A * 6/1980 Wilson .................. G01S 17/74
250/338.1
(Continued)

FOREIGN PATENT DOCUMENTS

JP  2008-149771 A  7/2008
JP  2009-015452 A  1/2009
(Continued)

OTHER PUBLICATIONS

International Search Report for PCT/KR2017/007325 (PCT/ISA/210) dated Sep. 14, 2017.

*Primary Examiner* — Nay Tun
(74) *Attorney, Agent, or Firm* — Birch, Stewart, Kolasch & Birch, LLP

(57) ABSTRACT

According to an embodiment, a vehicle driving assistance device mounted in a vehicle comprises: a memory for storing an identification of a vehicle; a visible light communication unit for modulating the identification stored in the memory, and outputting the modulated identification through visible light; and a processor for activating the visible light communication unit when the vehicle enters a parking lot entrance gate, and performing control such that the visible light including the identification of the vehicle is outputted according to the activation of the visible light communication unit.

8 Claims, 16 Drawing Sheets

(51) Int. Cl.
*B62D 15/02* (2006.01)
*G08G 1/005* (2006.01)
*G06Q 50/30* (2012.01)
*G08G 1/017* (2006.01)
*H04B 10/116* (2013.01)

(52) U.S. Cl.
CPC .............. *G08G 1/017* (2013.01); *G08G 1/04* (2013.01); *G08G 1/14* (2013.01); *H04B 10/116* (2013.01); *G06Q 2240/00* (2013.01)

(58) Field of Classification Search
CPC . G06Q 2240/00; H04B 10/116; B62D 15/028
See application file for complete search history.

(56) References Cited

U.S. PATENT DOCUMENTS

| | | | | |
|---|---|---|---|---|
| 4,665,395 | A * | 5/1987 | Van Ness | G07C 9/00111 340/5.25 |
| 5,422,473 | A * | 6/1995 | Kamata | G06K 17/0022 235/384 |
| 6,476,715 | B1 * | 11/2002 | Bromer | B60R 25/00 340/425.5 |
| 9,354,067 | B2 * | 5/2016 | Chao | G01C 21/206 |
| 10,425,168 | B2 * | 9/2019 | Yamasaki | H04B 10/66 |
| 2009/0072996 | A1 * | 3/2009 | Schoepp | B60Q 1/1423 340/903 |
| 2010/0309024 | A1 * | 12/2010 | Mimeault | G08G 1/04 340/932.2 |
| 2011/0156925 | A1 | 6/2011 | Lee et al. | |
| 2012/0284209 | A1 * | 11/2012 | Duffy | G07B 15/02 705/418 |
| 2015/0170517 | A1 * | 6/2015 | Yan | G08G 1/04 340/932.2 |
| 2018/0152250 | A1 * | 5/2018 | Yamasaki | H04B 10/116 |

FOREIGN PATENT DOCUMENTS

| | | | |
|---|---|---|---|
| JP | 2010-241311 | A | 10/2010 |
| KR | 10-2010-0019034 | A | 2/2010 |
| KR | 10-2011-0075371 | A | 7/2011 |
| KR | 10-2012-0131555 | A | 12/2012 |
| KR | 10-1266815 | B1 | 5/2013 |
| KR | 10-2014-0027574 | A | 3/2014 |
| KR | 10-2014-0087524 | A | 7/2014 |
| KR | 20140087524 | A * | 7/2014 |
| KR | 10-2014-0118441 | A | 10/2014 |
| KR | 10-2014-0121499 | A | 10/2014 |
| KR | 10-2014-0121500 | A | 10/2014 |
| KR | 10-1488571 | B1 | 2/2015 |

* cited by examiner

[Fig. 1]
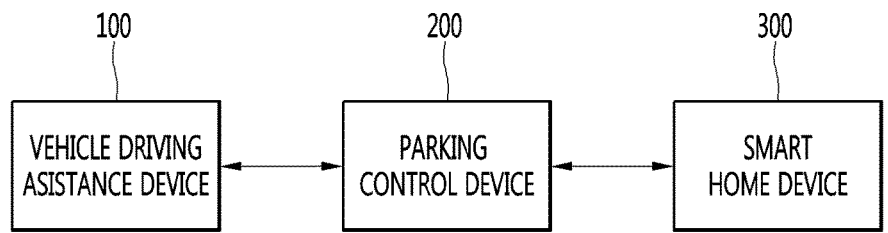
[Fig. 2]
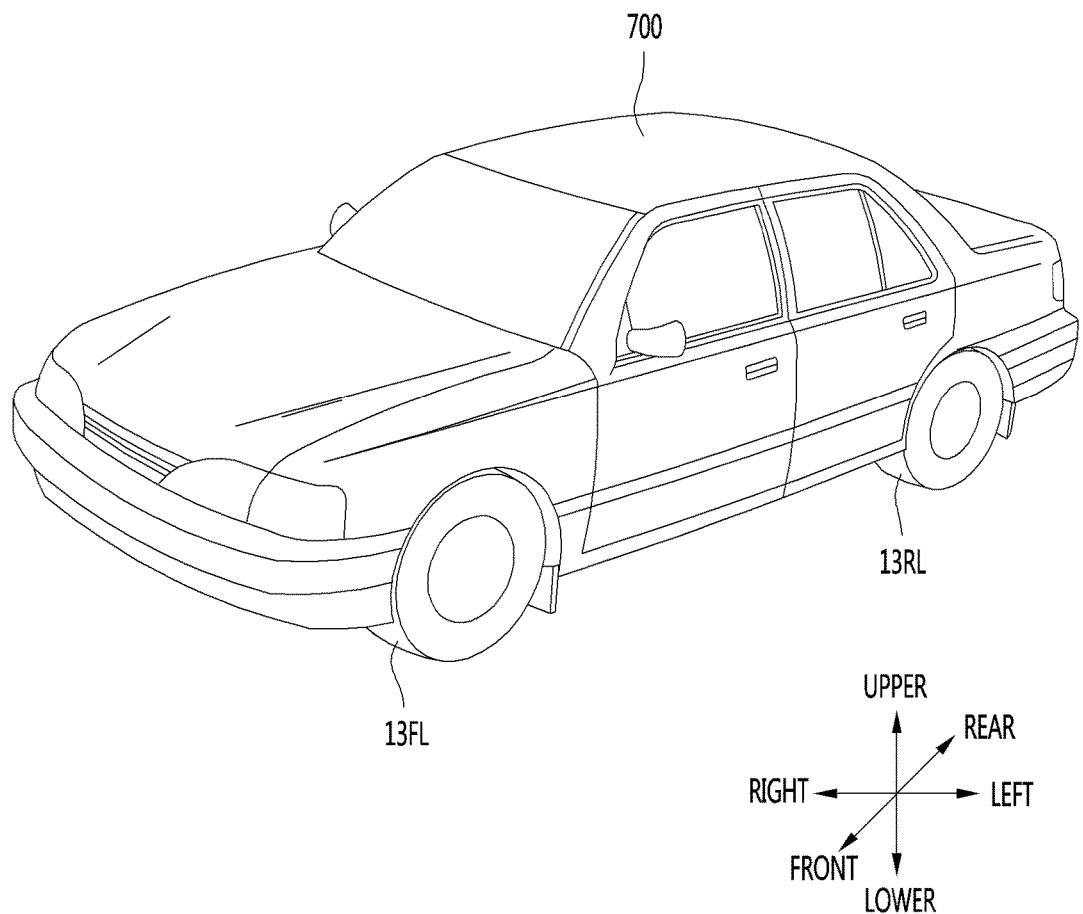

[Fig. 3]
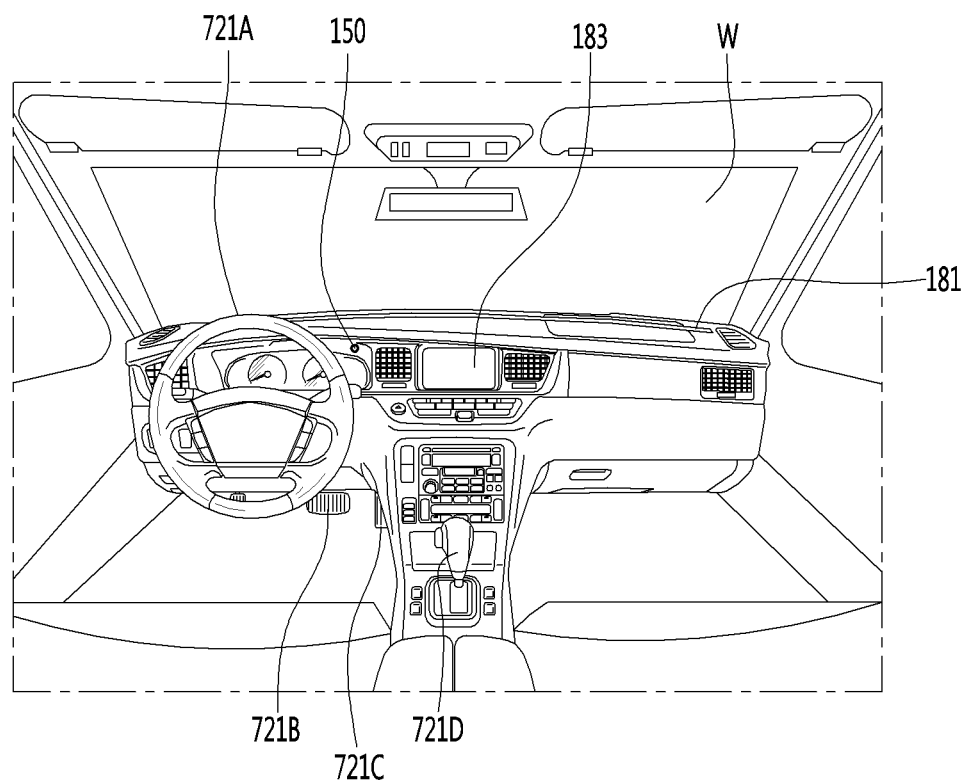

[Fig. 4]
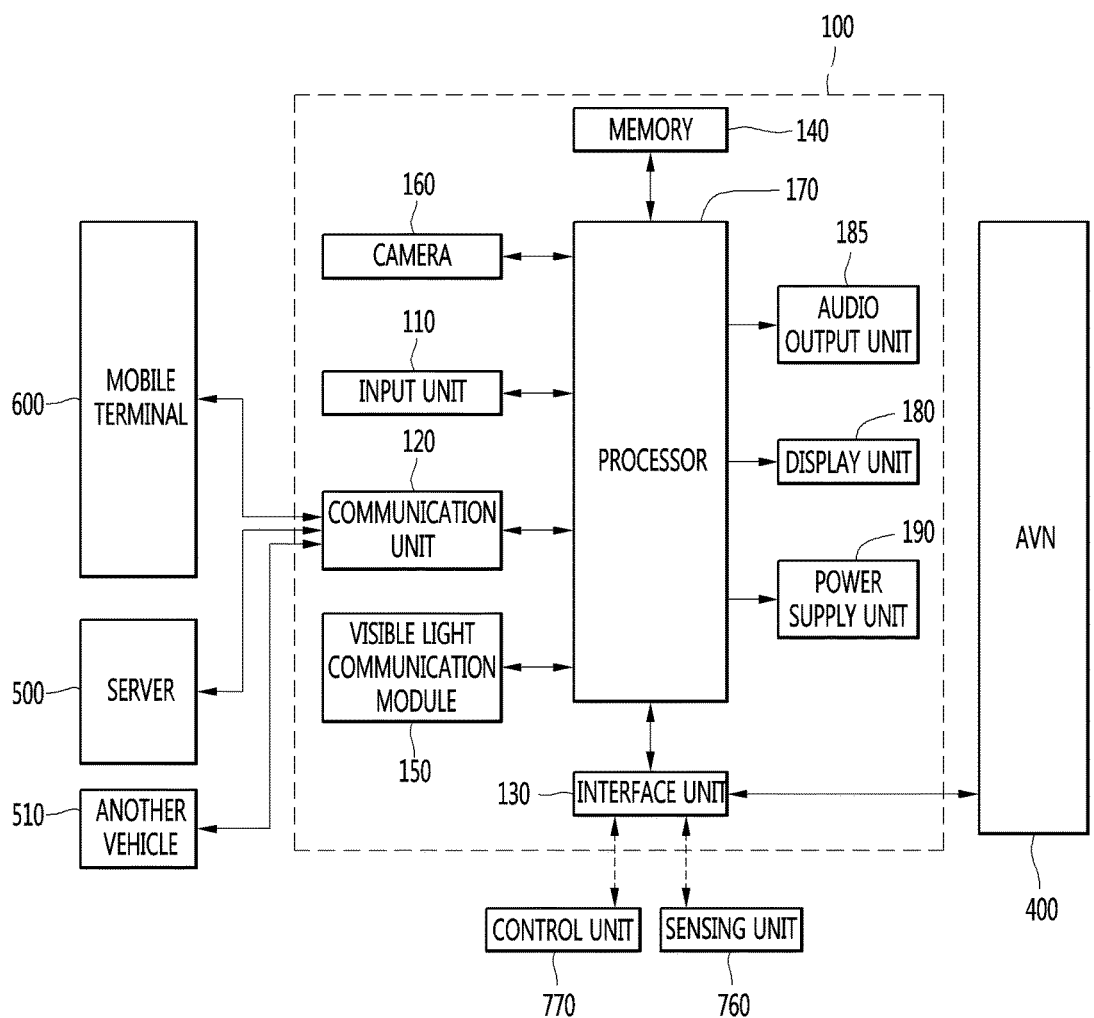

[Fig. 5]
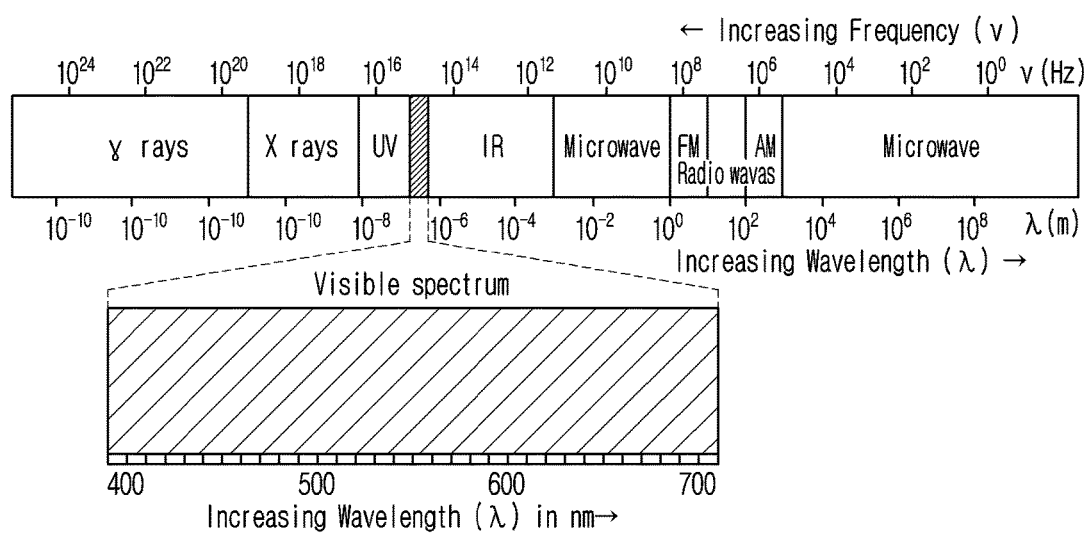

[Fig. 6]
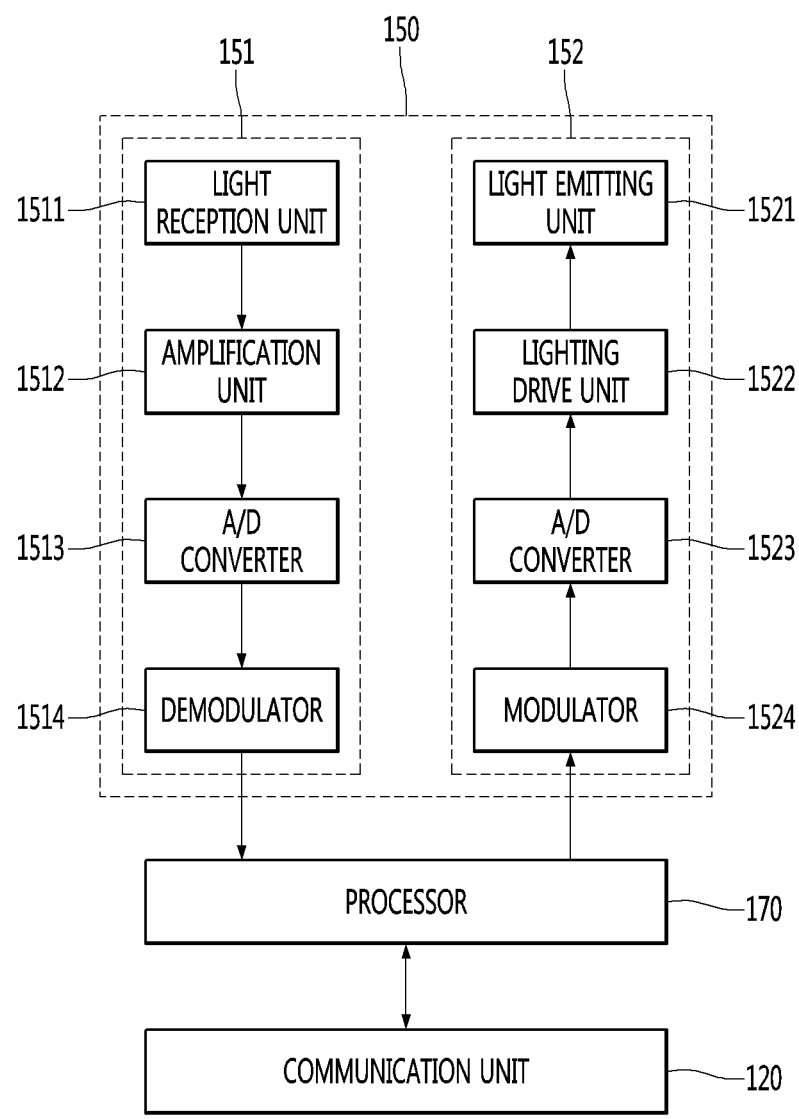

【Fig. 7】
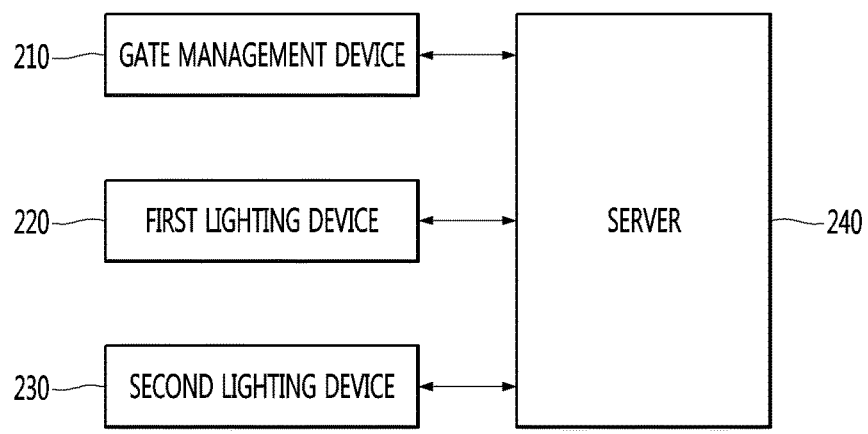
【Fig. 8】
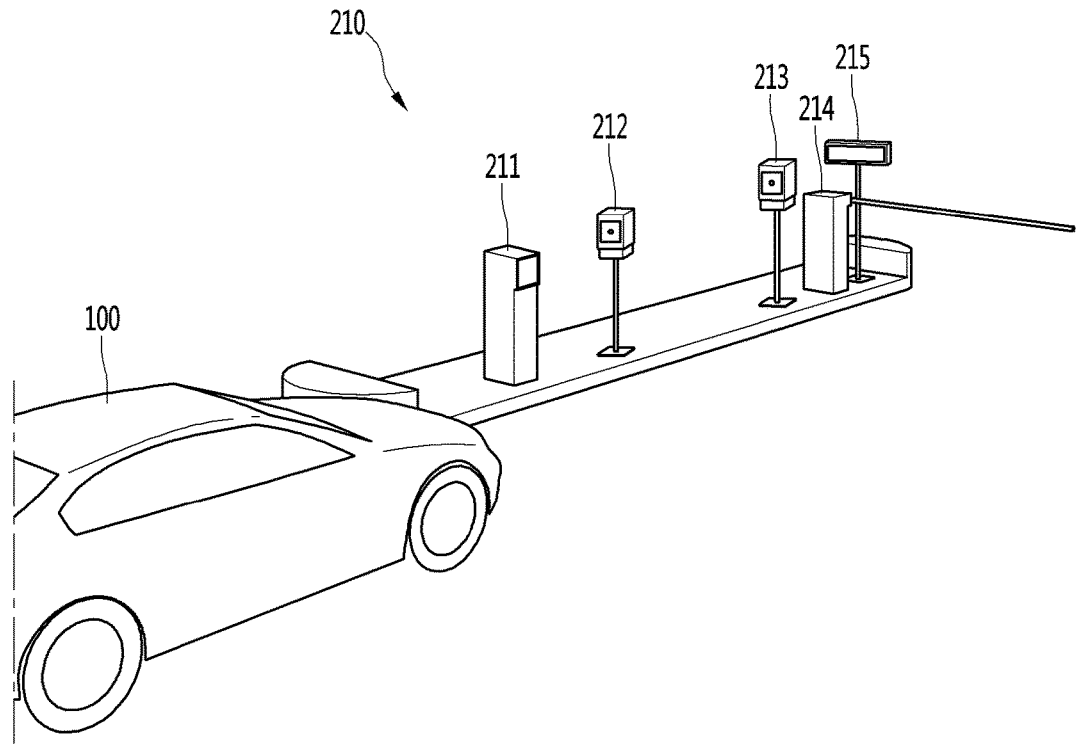

【Fig. 9】
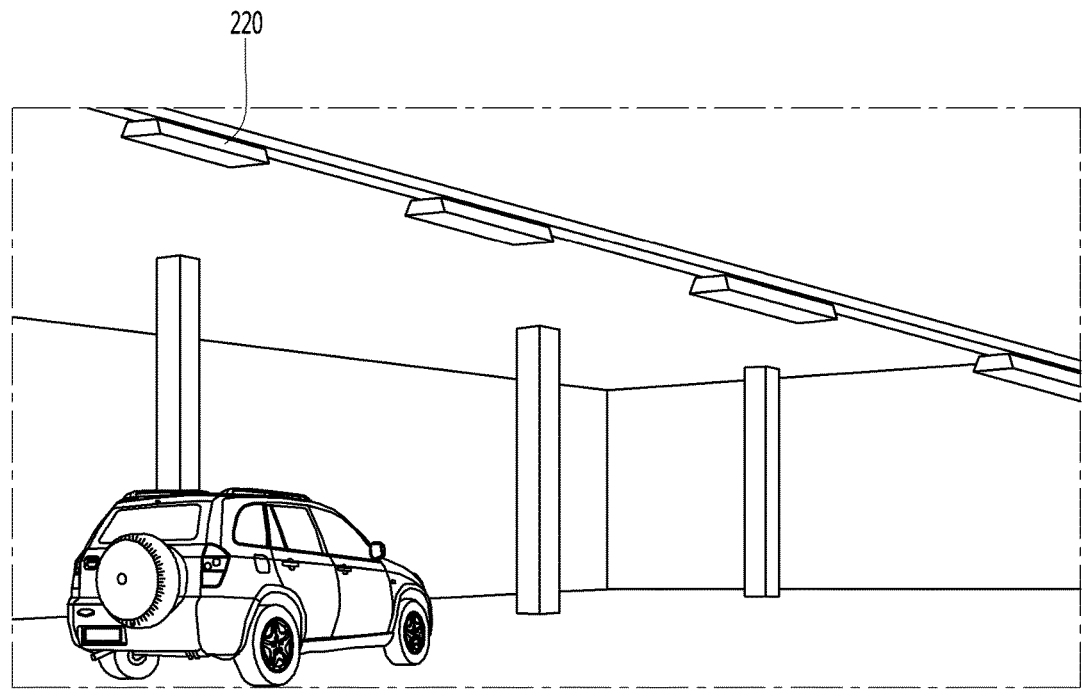
【Fig. 10】
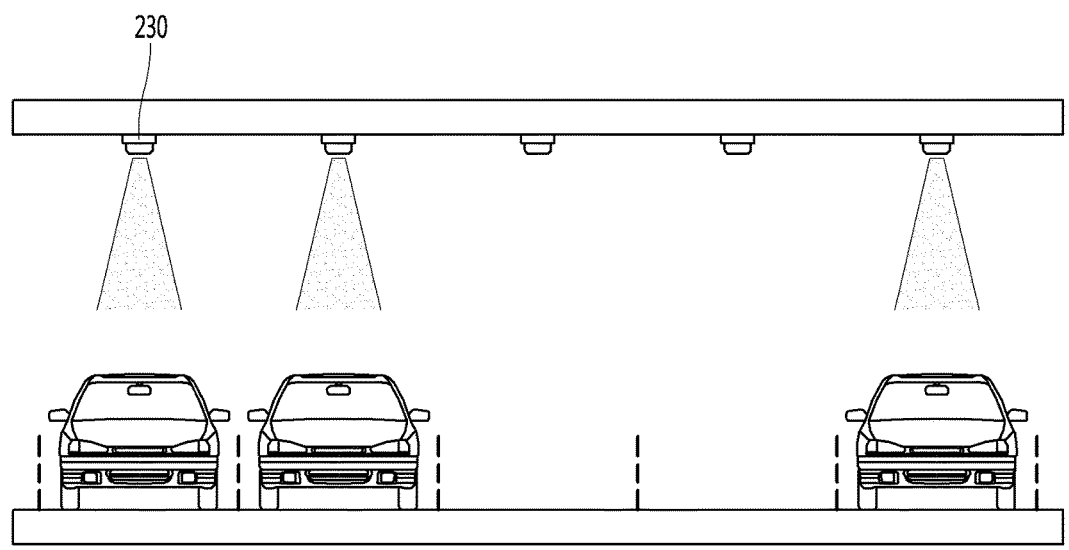

[Fig. 11]
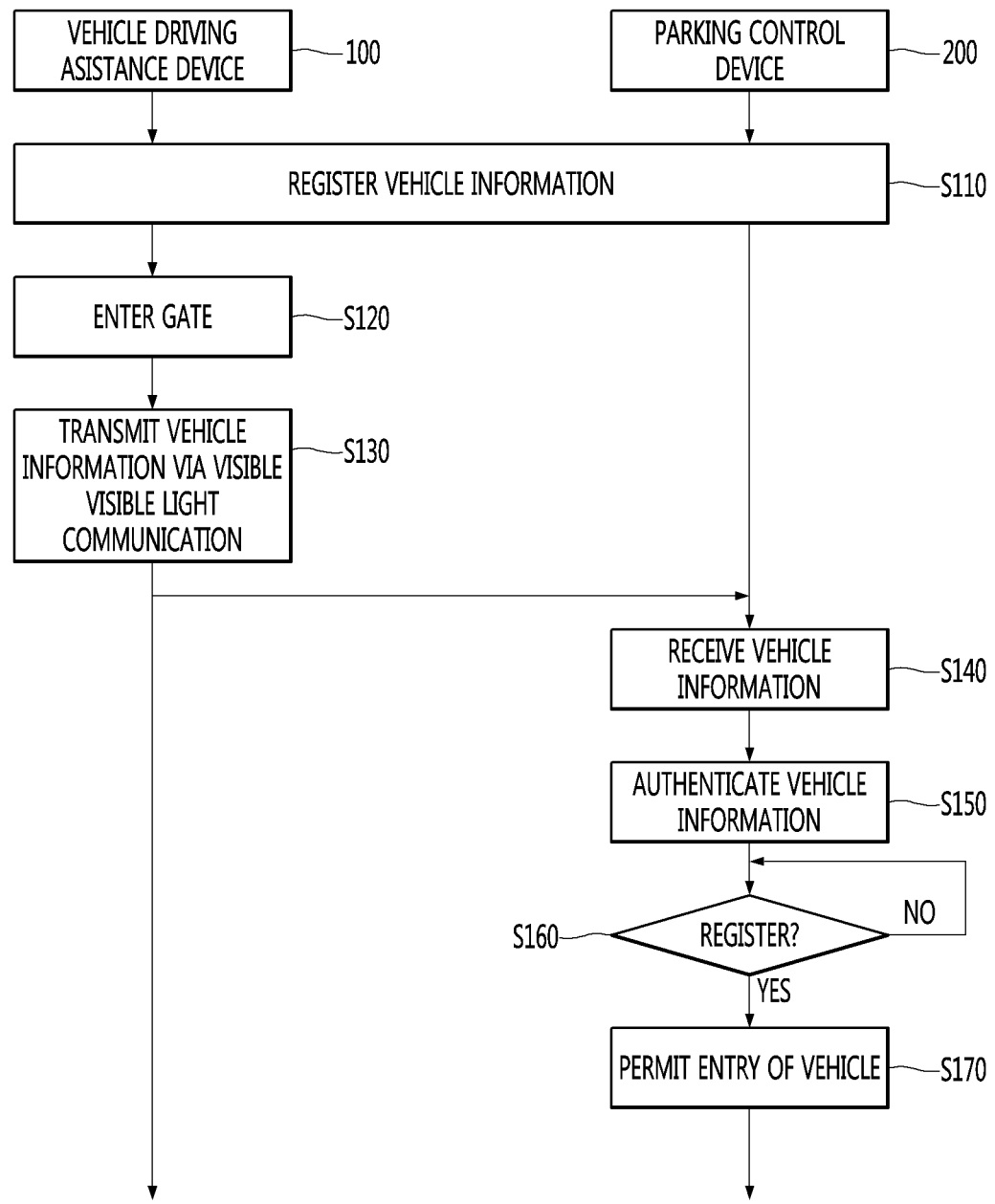

【Fig. 12】
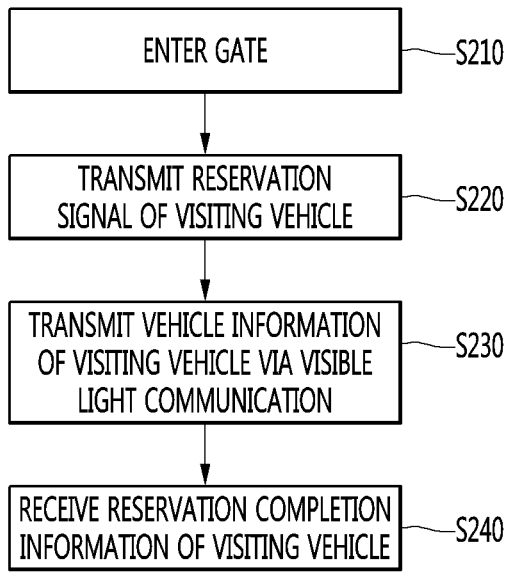
【Fig. 13】
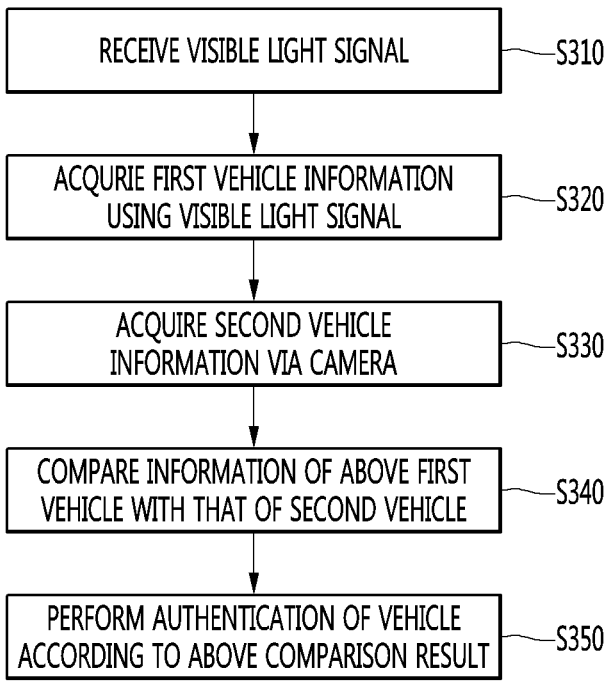

[Fig. 14]
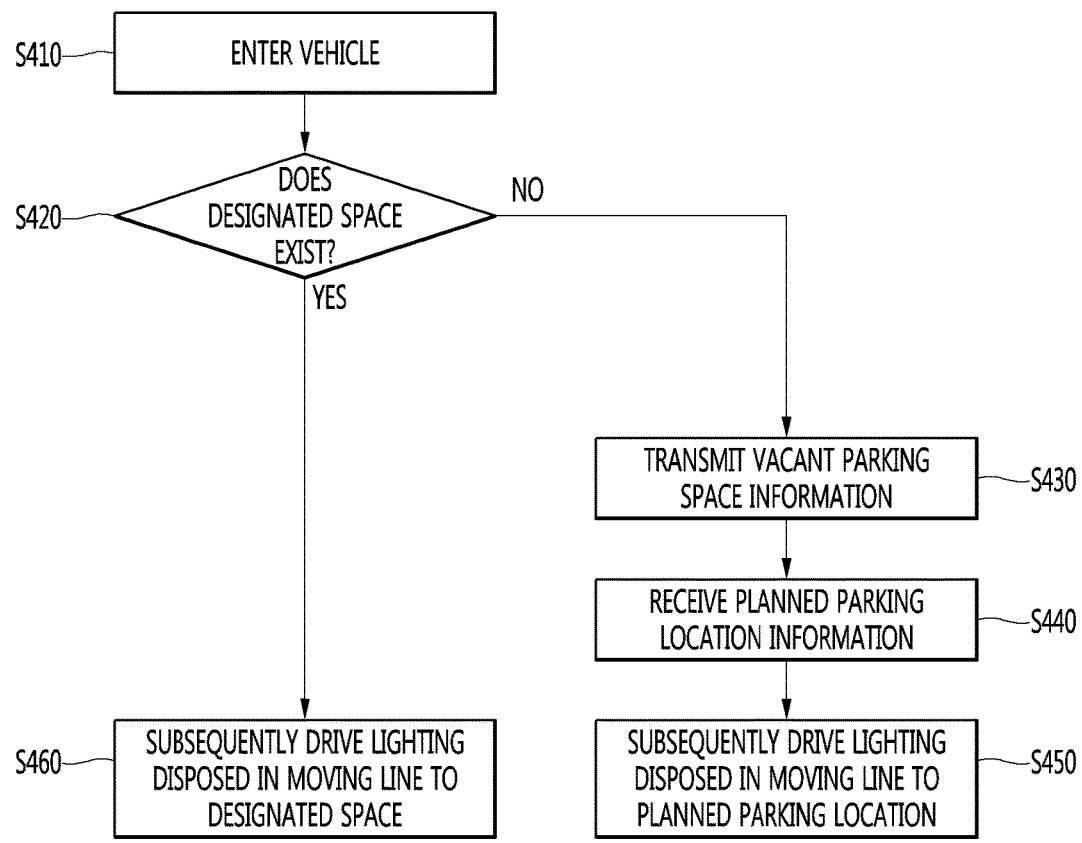

【Fig. 15】
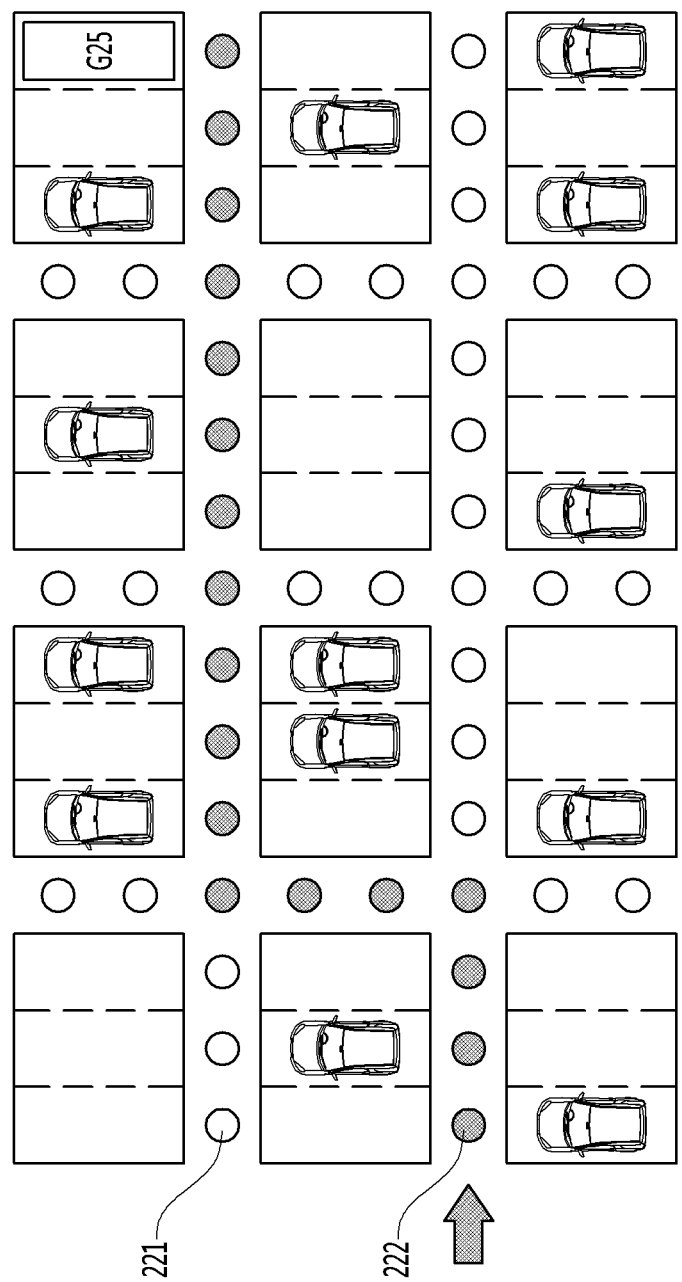

[Fig. 16]
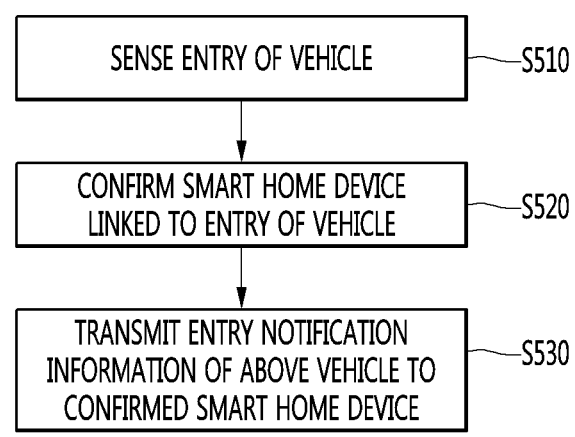

[Fig. 17]

VEHICLE ENTRANCE NOTIFICATION

VEHICLE A PRE-REGISTERED AT NUMBER 502 HAS PASSED EXTRANCE GATE

| CONFIRM | CANCLE |

(A)

VEHICLE ENTRANCE NOTIFICATION

VEHICLE B HAVING RESERVATION OF VISITING NUMBER 502 HAS PASSED EXTRANCE GATE

| CONFIRM | CANCLE |

(B)

【Fig. 18】
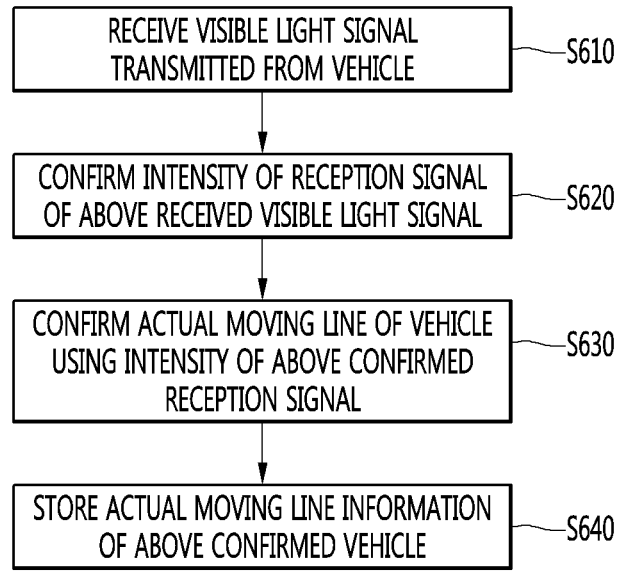
【Fig. 19】
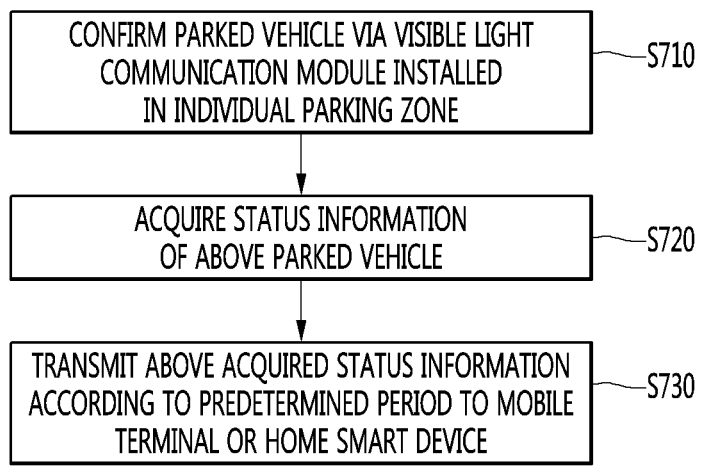

[Fig. 20]
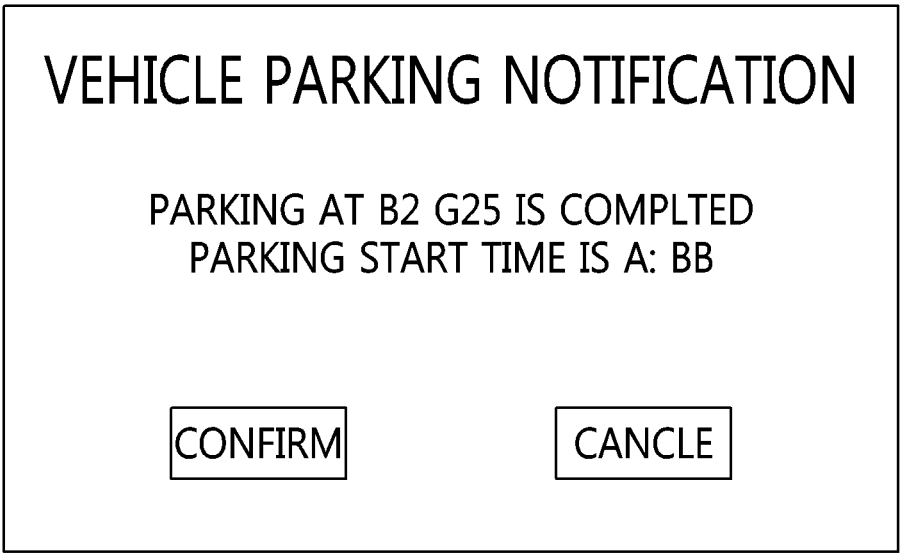
(A)
(B)

[Fig. 21]
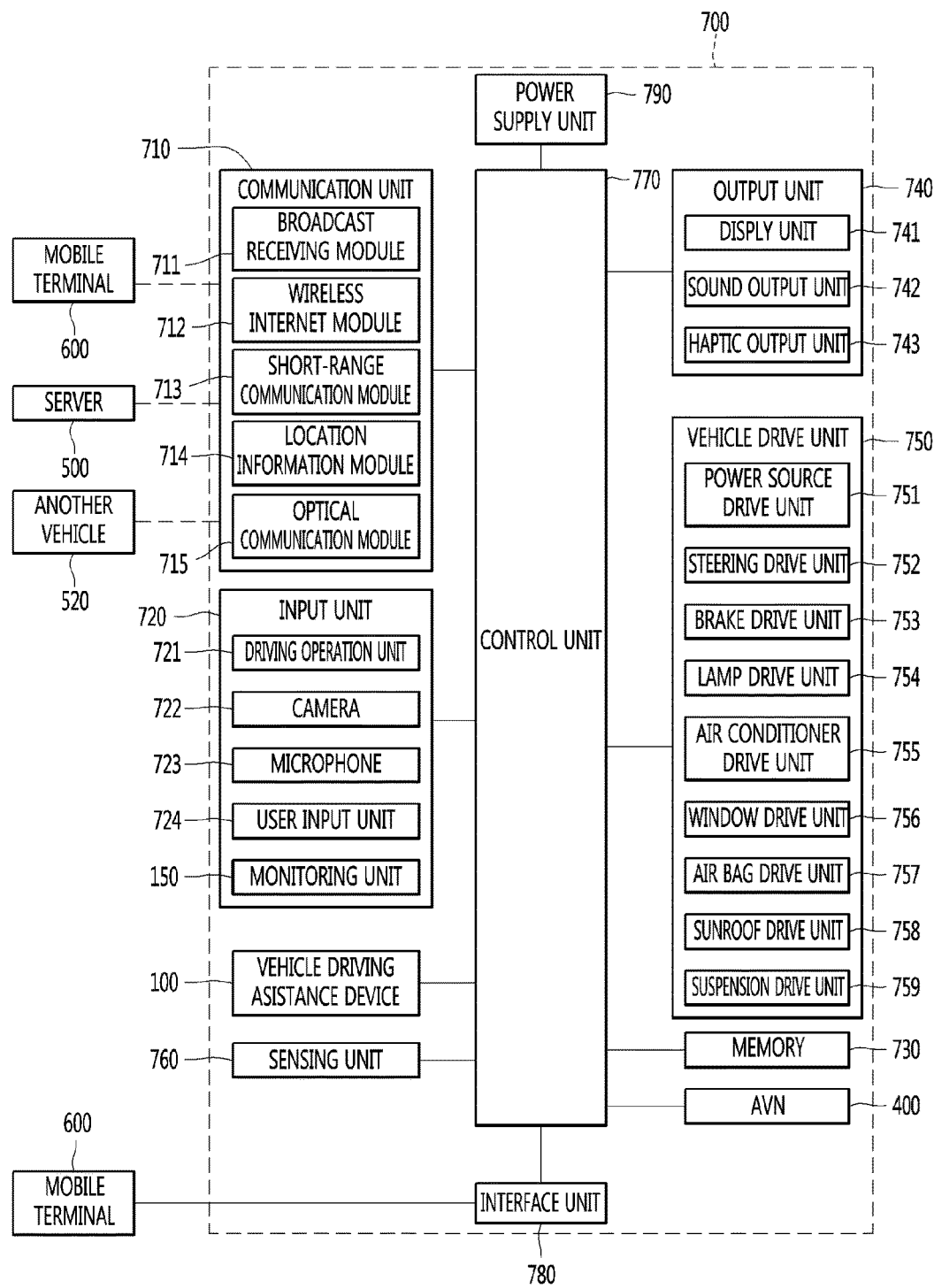

VEHICLE DRIVING ASSISTANCE DEVICE AND PARKING CONTROL SYSTEM INCLUDING SAME

CROSS REFERENCE TO RELATED APPLICATIONS

This application is the National Phase of PCT International Application No. PCT/KR2017/007325, filed on Jul. 7, 2017, which claims priority under 35 U.S.C. 119(a) to Patent Application No. 10-2016-0086411, filed in the Republic of Korea on Jul. 7, 2016, all of which are hereby expressly incorporated by reference into the present application.

TECHNICAL FIELD

The present invention relates to a vehicle driving assistance device, and more particularly to a vehicle driving assistance device capable of performing a parking control of a vehicle by using visible light communication (VLC), a parking control system, and an operation method thereof.

BACKGROUND ART

A vehicle is a device that moves in a direction desired by a user to board therein. Typically, cars may be cited as examples.

According to a prime mover used, a vehicle is classified into an internal combustion engine vehicle, an external combustion engine vehicle, a gas turbine vehicle, and an electric vehicle, etc.

An electric vehicle refers to a vehicle that turns an electric motor by using electricity as energy, and includes a pure electric vehicle, a hybrid electric vehicle (HEV), a plug-in hybrid electric vehicle (PHEV), a fuel cell electric vehicle (FCEV), and the like.

Meanwhile, recently, an intelligent vehicle (Smart Vehicle) has been actively developed for safety or convenience of a driver, a pedestrian, and the like.

An intelligent vehicle is also called a smart vehicle as a state-of-the-art vehicle that combines information technology (IT). The intelligent vehicle provides optimum traffic efficiency through interoperating with an intelligent transportation system (ITS) as well as introducing an advanced system in a vehicle itself.

For example, an intelligent vehicle has an advantage of technology to maximize safety of drivers and passengers, and pedestrians by developing safety-related core technologies such as adaptive cruise control (ACC), obstacle detection, collision detection, or mitigation equipment.

Meanwhile, recently, due to an increase of vehicles, many people often drive their cars to their destination, so that it is often a case that vehicles must be stably parked on a parking lot until their work is completed. Therefore, places in which vehicles are frequently in and out, such as department stores, government offices, large-scale buildings, and parking buildings, are in the status of controlling only entering and exiting of vehicles while collecting parking fees.

That is, when a vehicle enters through an entrance and a driver takes a ticket for collecting a parking fee, a breaker is opened to allow the vehicle to enter the inside, when the vehicle completed parking comes out, it is required to pay an appropriate fee according to a recorded entry time, and only when the breaker is opened after the fee has been paid, the vehicle can exit outside of the parking lot.

However, in the conventional parking control system as described above, after a vehicle has entered the inside of the parking lot, since drivers have to find an empty parking space for parking by themselves, it takes a lot of time, and there was a disadvantage that many accidents occur, such as air pollution, a time loss, and a vehicle collision accident in a narrow space, by traveling at a low speed in a parking lot to park a vehicle.

Recently, in order to solve such problems, a guider is placed between an entrance of each parking floor and a parking lot block to guide a parking space, and when there is no more space, a method of guiding to another parking lot after blocking entry of a vehicle is used.

However, there is a limitation in checking an empty space even in the case of using such a guider, and there was a problem that excessive manpower and cost are required.

DISCLOSURE

Technical Problem

An embodiment of the present invention is directed to providing a vehicle driving assistance device, a parking control system, and an operation method thereof, which may perform a parking control of a vehicle by acquiring vehicle information via a lamp equipped with a visible light communication function in the vehicle.

In addition, the present invention is directed to providing a vehicle driving assistance device, a parking control system, and an operation method thereof, which may output parking guide information in different ways from each other according to information of an entering vehicle.

In addition, the present invention is directed to providing a vehicle driving assistance device, a parking control system, and an operation method thereof, so as to more easily perform a visit reservation of an unregistered vehicle.

In addition, an embodiment of the present invention is directed to providing a vehicle driving assistance device, a parking control system, and an operation method thereof, which may acquire a vehicle parking status information in each of individual parking zones via a visible light communication module installed in an individual parking zone and may control the acquired vehicle parking status information.

The technical problems to be solved in the proposed embodiments may not be limited to the technical problems mentioned above, and other technical subjects not mentioned may be clearly understood by those skilled in the art to which the embodiments proposed from the following description belong.

Technical Solution

A vehicle driving assistance device mounted in a vehicle according to an embodiment includes: a memory for storing an identification ID of the vehicle; a visible light communication unit modulating the identification ID stored in the memory and outputting the modulated identification ID through visible light; and a processor that activates the visible light communication unit as the vehicle approaches a parking entrance gate and controls the visible light including the identification ID of the vehicle to be output as the visible light communication unit is activated.

In addition, the visible light communication unit includes a modulator modulating the identification ID, a visible light transmitter including a lighting outputting the modulated identification ID through visible light, a receiver receiving visible light outputted with data from the outside, and a visible light receiver including a data acquisition unit acquiring data included in the visible light by demodulating the received visible light.

Further, the vehicle driving assistance device further includes a wireless communication unit that performs communicating with a parking control device to exchange data with the parking control device, and the processor, when an authentication of the transmitted identification ID is successfully authenticated, receives parking space information via at least one of the visible light communication unit and the wireless communication unit, and transmits parking location information corresponding to a planned parking location of the vehicle to the parking control device based on the received parking space information.

Furthermore, the vehicle driving assistance device further includes an input unit in which vehicle reservation information corresponding to a visiting vehicle from the outside is inputted, and the processor, when the vehicle reservation information is inputted, outputs a visible light signal including the vehicle reservation information via the visible light communication unit.

In addition, the processor, when the identification ID is authenticated, outputs a visible light signal for acquiring status information of the vehicle via the visible light communication unit at every predetermined period of time.

Further, the processor receives parking status information of the vehicle transmitted from the parking control device via the wireless communication unit, and transmits the received parking status information to at least one of a pre-registered mobile terminal and smart home device.

In addition, the lighting includes at least one of a side lamp, a stop lamp, a front lamp, and a tail lamp provided on the vehicle.

Meanwhile, a parking control system according to an embodiment includes: a vehicle driving assistance device, which is provided in a vehicle, stores a vehicle identification ID of the vehicle, and outputs a visible light signal including the stored identification ID; and a parking control device includes a server receiving a visible light signal transmitted via the vehicle driving assistance device, acquiring an identification ID included in the received visible light signal, and determining whether to permit entry of the vehicle according to an authentication result of the acquired identification ID, wherein the server, when the authentication of the identification ID is successfully performed, confirms a planned parking location of the vehicle, and outputs guide information such that the vehicle is moved to the confirmed planned parking location.

In addition, when an designated parking space of the vehicle is present, the server sets the designated parking space to the planned parking location, and when the designated parking space is not present, the server transmits parking space information on an empty parking space at the present time to the vehicle driving assistance device, and sets parking location information received based on the transmitted parking space information to the planned parking location of the vehicle.

In addition, the parking control device further includes a visible light communication unit installed at an entrance gate and receiving a visible light signal transmitted via the vehicle driving assistance device to acquire an identification ID, and a camera installed at the entrance gate and photographing a vehicle entering the entrance gate to acquire a vehicle ID, and the server compares the identification ID with the vehicle ID and determines whether to allow the vehicle to enter the gate based on the comparison result.

In addition, the parking control device receives a visible light signal including a vehicle ID of a visiting vehicle via the vehicle driving assistance device, and registers a visit reservation of the visiting vehicle by acquiring the vehicle ID from the received visible light signal.

Further, the parking control device includes a plurality of first lighting devices installed in a traveling path of a vehicle in a parking lot, and when the planned parking location is set, the server sequentially drives at least one first lighting device disposed in a moving line between the current location of the vehicle and the planned parking location.

Furthermore, the parking control device further includes a plurality of second lighting devices respectively installed in an individual parking zone and receiving a visible light signal transmitted from a vehicle parked in the individual parking zone to acquire status information of the parked vehicle.

In addition, the server receives status information transmitted from the plurality of second lighting devices, and transmits the received status information to a pre-registered mobile terminal and a smart home device, and the status information includes at least one of parking location information, parking time information, and parking fee information.

In addition, the vehicle driving assistance device, when the identification ID is authenticated, outputs a visible light signal for acquiring status information of the vehicle at every predetermined period of time, and the plurality of first lighting devices receive a visible light signal transmitted from the vehicle driving assistance device and transmit strength information of the received visible light signal to the server, and the server acquires actual moving line information on the vehicle by using the strength information transmitted from the plurality of first lighting devices.

In addition, the server drives a first lighting device disposed on an actual moving line of the vehicle based on the strength information.

Further, the server confirms a smart home device associated with the vehicle based on an identification ID of the vehicle as the vehicle enters, and transmits entry notification information of the vehicle to the confirmed smart home device.

Furthermore, when a vehicle registration signal is received from the vehicle driving assistance device, the server requests registration information for vehicle registration from the vehicle driving assistance device, and receives a visible light signal including the registration information from the vehicle driving assistance device to perform vehicle registration, wherein the registration information includes at least one of an identification ID of a vehicle, generation information of the vehicle, mobile terminal information associated with the vehicle, and smart home device information associated with the vehicle.

Advantageous Effects

According to an embodiment of the present invention, a parking control of a vehicle is performed by acquiring vehicle information via a lamp equipped with a visible light communication function in the vehicle, and thus it is unnecessary to provide a sensor or an electric wire cable, etc. for the parking control of the vehicle, so that the installation and maintenance of the vehicle can be easily performed, and the parking control can be performed more efficiently.

In addition, according to an embodiment of the present invention, it is possible to perform a parking guidance of the vehicle more efficiently by sequentially driving a lighting included in a moving line of an assigned parking zone or a selected parking zone of an entered vehicle, thereby improving user satisfaction.

In addition, according to an embodiment of the present invention, it is possible to more easily perform a visit reservation for a visiting vehicle by providing information of an unregistered vehicle to a parking control device by using a lamp provided in the registered vehicle.

In addition, according to an embodiment of the present invention, vehicle parking status information in each of individual parking zones is acquired via a visible light communication module installed in an individual parking zone and is provided to a user, so that it is possible for the user to efficiently manage a parking location, a parking time, and an abnormal status information of a vehicle, thereby improving user satisfaction.

In addition, according to an embodiment of the present invention, it is possible to trace a location of a vehicle without separate a sensor by receiving visible light communication data output from a lamp of a vehicle and driving a lighting according to a location of the vehicle based on the received signal strength of the received visible light communication data, thereby reducing energy consumption by driving only the lighting disposed at the current location of the vehicle.

In addition, according to an embodiment of the present invention, moving line information of a vehicle is stored by using visible light communication data output from a lamp of a vehicle, so that it is possible to prepare for various situations that may occur in a parking lot by using the moving line information later.

DESCRIPTION OF DRAWINGS

FIG. 1 is a block diagram showing a configuration of a parking control system according to an embodiment of the present invention.

FIG. 2 is a view showing an external appearance of a vehicle provided with a vehicle driving assistance device according to an embodiment of the present invention.

FIG. 3 is a view showing an internal appearance of a vehicle provided with a vehicle driving assistance device according to an embodiment of the present invention.

FIG. 4 is a block diagram of a vehicle driving assistance device according to an embodiment of the present invention.

FIG. 5 is a view showing a signal spectrum in a vehicle driving assistance device according to an embodiment of the present invention.

FIG. 6 is a detailed configuration block diagram of a visible light communication module shown in FIG. 4.

FIG. 7 is a detailed block diagram of a parking control device 200 shown in FIG. 1.

FIG. 8 is a block diagram of a gate control device shown in FIG. 7.

FIG. 9 is a configuration diagram of a first lighting device shown in FIG. 7.

FIG. 10 is a configuration diagram of a second lighting device shown in FIG. 7.

FIGS. 11 to 20 is a view for explaining an operation method of a parking control system according to an embodiment of the present invention.

FIG. 21 is an example of an internal block diagram of the vehicle of FIG. 2.

MODES OF THE INVENTION

Hereinafter, exemplary embodiments of the present invention will be described in detail with reference to the accompanying drawings, wherein like reference numerals are used to designate identical or similar elements, and redundant description thereof will be omitted. The suffix "module" and "portion" of the components used in the following description are only given or mixed in consideration of ease of preparation of the description, and there is no meaning or role to be distinguished as it is from one another. Also, in the following description of the embodiments of the present invention, a detailed description of related arts will be omitted when it is determined that the gist of the embodiments disclosed herein may be obscured. Also, the accompanying drawings are included to provide a further understanding of the invention, are incorporated in, and constitute a part of this description, and it should be understood that the invention is intended to cover all modifications, equivalents, or alternatives falling within the spirit and scope of the invention.

Terms including ordinals, such as first, second, etc., may be used to describe various components, but the elements are not limited to these terms. The terms are used only for distinguishing one component from another.

When a component is referred to as being "connected" or "joined" to another component, it may be directly connected or joined to the other component, but it should be understood that other component may be present therebetween. When a component is referred to as being "directly connected" or "directly joined" to another component, it should be understood that other component may not be present therebetween.

A singular representation includes plural representations, unless the context clearly implies otherwise.

In the present application, terms such as "including" or "having" are used to specify the presence of features, numbers, steps, operations, components, parts, or combinations thereof described in the description. However, it should be understood that the terms do not preclude the presence or addition of one or more other features, numbers, steps, operations, components, parts, or combinations thereof.

A vehicle described in the present invention may be a concept including a vehicle, or a motorcycle. Hereinafter, a vehicle will be mainly described in terms of a vehicle.

The vehicle described in the present invention may be a concept including all of an internal combustion engine vehicle having an engine as a power source, a hybrid vehicle having an engine and an electric motor as a power source, and an electric vehicle having an electric motor as a power source.

In the following description, a left side of a vehicle refers to a left side in a traveling direction of the vehicle, and a right side of the vehicle refers to a right side in the traveling direction of the vehicle.

Unless otherwise mentioned in the following description, a left hand drive (LHD) vehicle will be mainly described.

Hereinafter, a vehicle driving assistance device according to an embodiment will be described in detail with reference to the accompanying drawings.

FIG. 1 is a block diagram showing a configuration of a parking control system according to an embodiment of the present invention, FIG. 2 is a view showing an external appearance of a vehicle provided with a vehicle driving assistance device according to an embodiment of the present invention, FIG. 3 is a view showing an internal appearance of a vehicle provided with a vehicle driving assistance device according to an embodiment of the present invention, FIG. 4 is a block diagram of a vehicle driving assistance device according to an embodiment of the present invention, FIG. 5 is a view showing a signal spectrum in a vehicle driving assistance device according to an embodiment of the present invention, and FIG. 6 is a detailed configuration block diagram of a visible light communication module shown in FIG. 4.

Referring to FIGS. 1 to 6, a vehicle 700 according to an embodiment may include wheels 13FL and 13FR rotated by a power source, driving operation units 721A, 721B, 721C and 721D configured to control traveling of the vehicle, and a vehicle driving assistance device 100.

Here, the vehicle driving assistance device 100 is a separate device that may perform a function of assisting driving by transmitting and receiving necessary information through data communication with the vehicle 700, and a set of some units of the vehicle 700 may be defined as the vehicle driving assistance device 100.

Some units of the vehicle driving assistance device 100 may not be included in the vehicle driving assistance device 100 but may be units of other devices mounted on a vehicle or the vehicle 700. Such units may be understood to be included in the vehicle driving assistance device 100 by transmitting and receiving data via an interface unit of the vehicle driving assistance device 100.

Although the vehicle driving assistance device 100 according to an embodiment directly includes individual units shown in FIG. 4, it is also possible to use the units directly installed in the vehicle 700 via an interface unit 130, or to implement as a combination of the individual units directly installed in the vehicle 700.

Although the vehicle driving assistance device 100 may be an idling restriction device that turns off an engine at the time of stopping, the following description will mainly focus on the aspect that the vehicle driving assistance device 100 turns on the engine.

Meanwhile, the vehicle driving assistance device 100 may be a visible light communication device having a visible light communication function. Here, the vehicle driving assistance device 100 constituting the visible light communication device may be provided with a lighting for transmitting a visible light signal, wherein the lighting for transmitting the visible light signal may a headlight provided in the vehicle 700.

Specifically, such a vehicle driving assistance device 100 may include an input unit 110, a communication unit 120, an interface unit 130, a memory 140, a visible light communication module 150, a camera 160, a processor 170, a display unit 180, an audio output unit 185, and a power supply unit 190.

First, the vehicle driving assistance device 100 may include the input unit 110 configured to sense a user input. A user may input an execution input for turning on/off a driving assistant function or turning on/off a power of the vehicle driving assistance device 100 via the input unit 110.

Preferably, the user may activate or deactivate a function of the visible light communication module 150 constituting the vehicle driving assistance device 100 via the input unit 110.

Such an input unit 110 may include at least one of a gesture input unit configured to sense a user gesture, a touch input unit configured to sense a touch, and a microphone configured to sense a voice input, and receive a user input.

Next, the vehicle driving assistance device 100 may include the communication unit 120 configured to communicate with another vehicle 510, a terminal 600 and a server 500, and the like. The vehicle driving assistance device 100 may receive navigation information and/or traffic information via the communication unit 120. In addition, the communication unit 120 may perform communication with a parking control device 200 to exchange information with each other.

In particular, the communication unit 120 may receive parking status information on a parking space of a parking lot from the parking control device 200. Here, the parking lot may be a parking lot provided in an apartment complex, a large shopping mall, a large mart, a commercial building, or the like, and the parking control device 200 may be a server for parking management of the parking lot.

Specifically, the communication unit 120 may exchange data with the mobile terminal 600 or the parking control device 200 in a wireless manner. In particular, the communication unit 120 may perform communication with the vehicle 700 equipped with the vehicle driving assistance device to exchange data.

Various data communication methods such as Bluetooth, WiFi, Direct WiFi, APiX, or NFC may be possible in a wireless data communication manner.

In addition, when the communication unit 120 receives parking status information from the parking control device 200, the communication unit 120 may transmit information on a planned parking location of the vehicle 700 to the parking control device 200 based on the parking status information.

Such parking status information may include information on each parking zone for a parking lot existing in a building into which the vehicle 700 has entered and information on a space where a parking space has already been occupied by other vehicles and a space that is vacant, before the parking of the vehicle 700 is performed.

The parking status information may include actual parking location information, parking time information, and vehicle abnormality status information, after the parking of the vehicle 70 is completed.

Next, the vehicle driving assistance device 100 may include the interface unit 130 that receives vehicle-associated data or transmits a signal processed or generated by the processor 170 to an outside.

Specifically, the vehicle driving assistance device 100 may receive navigation information and/or sensor information via the interface unit 130.

The interface unit 130 may perform data communication with a control unit 770, an audio video navigation (AVN) device 400, a sensor unit 760, and the like inside the vehicle in a wired or wireless communication manner.

The interface unit 130 may receive the navigation information by the data communication with the control unit 770, the AVN device 400 and/or a separate navigation device.

In addition, the interface unit 130 may receive sensor information from the control unit 770 or the sensor unit 760.

Here, the sensor information may include at least one of traveling direction information of the vehicle 700, vehicle position information, vehicle speed information, acceleration information, vehicle tilt information, advance reverse information, fuel information, information on a distance from a preceding/rear vehicle, information on a distance between a vehicle and a lane, and turn signal information.

Further, the sensor information may be acquired from a heading sensor, a yaw sensor, a gyro sensor, a position module, a vehicle forward/reverse sensor, a wheel sensor, a vehicle speed sensor, a vehicle tilt sensor, a battery sensor, a fuel sensor, a tire sensor, a steering sensor based on rotation of a steering wheel, a vehicle interior temperature sensor, a vehicle interior humidity sensor, or the like. Meanwhile, the position module may include a GPS module for receiving GPS information.

The interface unit 130 may receive a user input received via the user input unit 110 of the vehicle 700. The interface unit 130 may receive a user input from an input unit 720 of the vehicle 700 or via the control unit 770. That is, when the input unit is disposed as a configuration in the vehicle itself, the user input may be received via the interface unit 130.

The user input may include visiting vehicle information for reservation of a visiting vehicle, input information for activating or deactivating a visible light communication function, setting information for setting a parking location at the time of parking of a vehicle, and the like.

Next, the memory 140 may store a variety of data for overall operation of the vehicle driving assistance device 100, such as a program for processing or control of the processor 170.

Such a memory 140 may be various storage devices, which are implemented in a hardware manner, such as ROM, RAM, EPROM, flash drive and hard drive.

In particular, the memory 140 may store an identification ID of the vehicle 700 on which the vehicle driving assistance device 100 is mounted.

Next, the vehicle driving assistance device 100 may include a monitoring unit (not shown) for capturing an image inside the vehicle.

Specifically, the monitoring unit (not shown) may detect and acquire biometric information of the user.

Such biometric information may include image information capturing the user, fingerprint information, iris-scan information, retina-scan information, hand geo-metry information, facial recognition information, and voice recognition information. That is, the monitoring unit (not shown) may include a sensor for sensing the biometric information of the user.

The processor 170 controls overall operation of the vehicle driving assistance device.

In particular, the processor 170 determines a status of the vehicle 700 equipped with the vehicle driving assistance device and controls an operation for providing parking information of the vehicle 700.

Meanwhile, the camera 160 may include an interior camera that captures surroundings of the vehicle and acquires an image in the vehicle.

In addition, the camera 160 may be provided at various locations of an outer portion of the vehicle.

A plurality of cameras 160 may be disposed at least one of the left side, rear, right side, front, and ceiling of the vehicle, respectively.

The left camera may be disposed in a case surrounding a left side mirror. Alternatively, the left camera may be disposed at an outer portion of the case surrounding the left side mirror. Alternatively, the left camera may be disposed at one region at an outer side of a left front door, a left rear door, or a left fender.

The right camera may be disposed in a case surrounding a right side mirror. Alternatively, the right camera may be disposed at an outer portion of the case surrounding the right side mirror. Alternatively, the right camera may be disposed at one region at an outer side of a right front door, a right rear door, or a right fender.

Further, the rear camera may be disposed at the vicinity of a rear license plate or a trunk switch. The front camera may be disposed at the vicinity of an emblem or a radiator grille.

The processor 170 may synthesize images captured in all directions and provide an around view image viewed from the top of the vehicle. Upon generating the around view image, boundary portions between respective image regions occur. Such a boundary portion may be subjected to image blending for natural display.

In addition, the ceiling camera may be disposed on the ceiling of the vehicle to capture the image of the vehicle in all directions.

Such a camera 160 may directly include an image sensor and an image processing module. The camera 160 may process a still image or a moving image acquired by the image sensor (e.g., CMOS or CCD). In addition, the image processing module may process the still image or moving image acquired via the image sensor, extract necessary image information, and deliver the extracted image information to the processor 170.

The display unit 180 may configure an inter-layer structure with a touch sensor, or may be integrally formed with the touch sensor to implement a touch screen. The touch screen may function as the user input unit, which provides an input interface between the vehicle driving assistance device and the user, and simultaneously, provide an output interface between the vehicle driving assistance device and the user.

The display unit 180 displays (outputs) information processed by the vehicle driving assistance device. For example, when a parking assistant function is executed by the vehicle driving assistance device, a user interface (UI) or a graphic user interface (GUI) associated with parking lot information of the building in which the vehicle 700 enters is displayed. In addition, the display unit 180 displays a captured and/or received image or a UI and a GUI.

The display unit 180 may include at least one of a liquid crystal display (LCD), a thin film transistor-liquid crystal display (TFT LCD), an organic light-emitting diode (OLED), a flexible display, and a three-dimensional display (3D display).

Some of these displays may be transparent or light transmissive so as to be seen therethrough. This may be referred to as a transparent display, and a representative example thereof is a transparent OLED (TOLED) and the like. A rear structure of the display unit 180 may be also configured as a light transmission structure. With this structure, the user may see an object located behind the vehicle driving assistance device body through a region occupied by the display unit 180 of the vehicle driving assistance device body.

There may be two or more display units 180 depending on an implementation form of the vehicle driving assistance device 100. For example, in the vehicle driving assistance device 100, a plurality of display units may be disposed to be spaced apart from each other or may be integrally disposed at one surface, and may be disposed at different surfaces, respectively.

When the display unit 180 and a sensor (hereinafter, referred to as 'touch sensor') that detects a touch operation form an inter layer structure (hereinafter, referred to as a 'touch screen'), the display unit 180 may be used as an input device in addition to an output device. The touch sensor may have a form of, for example, a touch film, a touch sheet, a touch pad or the like.

The touch sensor may be configured to convert a change in a pressure applied to a specific portion of the display unit 180, a capacitance generated at a specific portion of the display unit 180 or the like into an electrical input signal. The touch sensor may be configured to detect not only a location and region to be touched but also a pressure and capacitance at the timing of touch.

When there is a touch input to the touch sensor, signal(s) corresponding thereto is sent to a touch controller. The touch controller processes the signal(s) and transmits the corresponding data to the processor 170. Thus, the processor 170 may know which region of the display unit 180 is touched or the like.

In addition, the processor 170 may determine a type of the touch input of the user based on the region, pressure, and capacitance at the timing of touch. Accordingly, the processor 170 may distinguish between a finger touch, a nail touch, a finger nod touch, and a multi-touch using a plurality of fingers of the user.

A proximity sensor may be disposed at an inner region of the mobile terminal surrounded by the touch screen or at the vicinity of the touch screen. The proximity sensor refers to a sensor that detects a presence of an object approaching a predetermined detection surface or an object existing at the vicinity of the detection surface without a mechanical contact using an electromagnetic force or an infrared ray. The proximity sensor has a longer lifetime and higher utilization than those of a contact-typed sensor.

Examples of the proximity sensor include a transmission-typed photoelectric sensor, a direct reflection-typed photoelectric sensor, a mirror reflection-typed photoelectric sensor, a high frequency oscillation-typed proximity sensor, a capacitive proximity sensor, a magnetic proximity sensor, and an infrared proximity sensor. When the touch screen is an electrostatic type, the touch screen is configured to detect a proximity of a pointer with a change of the electric field according to the proximity of the pointer. In this case, the touch screen (touch sensor) may be classified as a proximity sensor.

Hereinafter, for the convenience of explanation, an act of recognizing that a pointer is located on the touch screen while the pointer is not in contact with and is proximate to the touch screen is referred to as "proximity touch", an act of actually touching of the pointer on the screen is referred to as "contact touch". The location in which the pointer is proximately touched on the touch screen refers to a location in which the pointer is vertically corresponding to the touch screen when the pointer is proximately touched.

The proximity sensor detects a proximity touch and a proximity touch pattern (e.g., a proximity touch distance, a proximity touch direction, a proximity touch speed, a proximity touch time, a proximity touch location, a proximity touch movement status, and the like). Information corresponding to the detected proximity touch operation and the proximity touch pattern may be displayed on the touch screen.

The audio output unit 185 may output audio data received from the outside or stored in the memory 140 via the communication unit 120. The audio output unit 185 may output a sound signal related to a function (e.g., a visible light communication function) performed at the vehicle driving assistance device. The audio output unit 185 may include a receiver, a speaker, a buzzer, and the like.

In addition, the power supply unit 190 may receive external power and interior power by the control of the processor 170 to supply power necessary for operation of the respective components.

Finally, the vehicle driving assistance device 100 may include the processor 170 that controls overall operation of individual units in the vehicle driving assistance device 100.

In addition, the processor 170 may control at least some of the components described with reference to FIG. 3 to drive an application program. Further, the processor 170 may operate at least two of the components included in the vehicle driving assistance device 100 in combination with each other for driving the application program.

Such a processor 170 may be implemented in a hardware manner using at least one selected from among application specific integrated circuits (ASICs), digital signal processors (DSPs), digital signal processing devices (DSPDs), programmable logic devices (PLDs), field programmable gate arrays (FPGAs), controllers, micro-cotrollers, microprocessors 170, and electric units for the implementation of other functions.

In particular, when the processor 170 senses whether the vehicle 700 has approached the parking lot entrance gate of a particular building, and when the vehicle 700 has approached the entrance gate, the processor 170 activates the visible light communication module 150.

That is, the visible light communication module 150 may maintain an inactive status during normal operation, and may be activated by the processor 170 when the processor 170 detects that the vehicle 700 has entered the parking entrance gate.

The processor 170 may perform communication with the parking control device 200 via the communication unit 120 and accordingly, the processor 170 may detect that the vehicle 700 has approached the entrance gate based on a signal transmitted from the parking control device 200.

In addition, the processor 170 controls the visible light communication module 150 as the vehicle 700 approaches the entrance gate to output a visible light signal including information of the vehicle 700 via the visible light communication module 150.

Here, the information of the vehicle 700 may include a vehicle number of the vehicle 700. That is, the information of the vehicle 700 may include a unique ID capable of being distinguished from other vehicles, and, for example, may be the above-described vehicle number.

Also, when the information of the visiting vehicle is input via the input unit, the processor 170 outputs the information of the visiting vehicle together with the information of the own vehicle through the visible light.

Accordingly, the visible light communication module 150 may output a visible light signal including not only the identification ID of the vehicle 700 but also reservation information for reservation of the visiting vehicle depending on the cases. Meanwhile, the visible light communication module 150 outputs a visible light signal at a predetermined period of time even after authentication is normally completed according to the transmission of the identification ID. The visible light signal output at every predetermined period of time is configured to acquire status information of the vehicle 700 via a first lighting device 220 and a second lighting device 230 constituting the parking control device 200.

In addition, the processor 170 displays a parking location setting screen for selectively setting the parking location of the vehicle 700 when the vehicle authentication according to the transmitted visible light signal is normally performed.

That is, in the parking lot, a designated parking space for the vehicle 700 may exist, and the designated parking space thereof may not exist. Accordingly, when the designated space exists, the parking location setting screen will not be displayed, and when the designated space does not exist, the parking location setting screen will be displayed.

In order to display the parking location setting screen, the processor 170 receives the parking information transmitted from the parking control device 200 via the communication unit 120, and displays the received parking information.

Then, the processor 170 transmits the information on the preset planned parking location to the parking control device 200 when the planned parking location is set via the displayed parking information. At this point, the information on the planned parking location may be transmitted to the parking control device 200 via the visible light signal by the visible light communication module 150. In addition, otherwise, the information on the planned parking location may be transmitted to the parking control device 200 via the communication unit 120.

Meanwhile, the processor 170 may perform an operation for registering a vehicle ID of the vehicle 700 equipped with the vehicle driving assistance device 100 in the parking control device 200. To this end, the processor 170 may receive the identification ID of the vehicle 700 via the input unit 110 and transmit the received identification ID to the parking control device 200 to register the identification ID in the parking control device 200.

At this point, the processor 170 may transmit a signal requesting the registration of the identification ID to the parking control device 200, and accordingly, may transmit the identification ID to the parking control device 200 according to reception of a registration permission signal of the identification ID from the parking control device 200. Meanwhile, when the parking control device 200 is a residential building such as an apartment, it is preferable that the processor 170 transmit residence information of a driver of the vehicle 700 to the parking control device 200 together with the identification ID.

Meanwhile, referring to FIG. 5, the above-described vehicle information is output in a visible light spectrum.

The visible light emitted by the visible light communication module 150 has a spectral wavelength band of 400 to 700 nm. Accordingly, the visible light communication module 150 dims and emits the light of the wavelength band according to the vehicle information.

Referring to FIG. 6, the visible light communication module 150 may include a visible light reception unit 151 and a visible light transmission unit 152.

In addition, the visible light reception unit 151 may include a light reception unit 1511, an amplification unit 1512, an A/D converter 1513, and a demodulator 1514.

Further, the visible light reception unit 152 may include a light emitting unit 1521, a lighting drive unit 1522, an A/D converter 1523, and a modulator 1524.

The light emitting unit 1521 may include a light source, and the light source may include a plurality of light emitting diodes or fluorescent lamps. Here, the light emitting unit 1521 may be any one of a plurality of light sources provided in the vehicle 700. For example, the light emitting unit 1521 may include any one of a front lamp including a day running light (DRL), a position lamp (PSTN), a turn signal lamp (TSL), and the like, and a rear combination lamp including a stop lamp, a tail lamp, a turn signal lamp, a backup lamp, an fog lamp, and the like, which are provided in the vehicle 700.

The modulator 1524 receives data and modulates the received data. Here, the data may be the information of the vehicle 700, that is, the unique ID of the vehicle 700. Furthermore, the modulator 1524 may store the unique ID of the vehicle 700 and may modulate the stored unique ID.

The A/D converter 1523 is an analog-to-digital converter and converts the data modulated via the modulator 1524. At this point, the modulator 1524 may further include a dimming unit, which may receive a dimming signal from the outside and process the dimming signal.

The lighting drive unit 1522 generates a lighting drive signal for outputting a visible light signal corresponding to the modulated data according to the processed dimming signal. In other words, the lighting drive unit 1522 outputs a control signal for controlling on/off of the light emitting unit 1521, and the control signal may be a power pulse signal for turning on/off the light emitting unit 1521 according to the modulated data.

The visible light emitted via the light emitting unit 1521 is output by loading the unique ID of the vehicle according to on-off time and the order of on-off.

The light reception unit 1511 may be a photoelectric element that receives light and photoelectrically converts the received light to output an electrical signal. Here, the light reception unit 1511 may be implemented as a photodiode.

Here, the electrical signal output via the light reception unit 1511 includes not only intensity information of the signal but also information on presence or absence of the signal.

The amplification unit 1512 amplifies the electrical signal output via the light reception unit 1511 to convert into a level capable of being processed (recognized) at the demodulator 1514.

The A/D converter 1513 converts the amplified signal into a signal of a recognizable form at the demodulator 1514.

The demodulator 1514 demodulates the electrical signal according to a code modulated at a modulator of a transmitter that has transmitted the visible light signal.

FIG. 7 is a detailed block diagram of a parking control device 200 shown in FIG. 1, FIG. 8 is a configuration diagram of a gate management device shown in FIG. 7, FIG. 9 is a configuration diagram of a first lighting device shown in FIG. 7, and FIG. 10 is a configuration diagram of a second lighting device shown in FIG. 7.

Hereinafter, the parking control device 200 will be described in detail with reference to FIGS. 7 to 10.

Referring to FIGS. 7 to 10, the parking control device 200 includes a gate management device 210, a first lighting device 220, a second lighting device 230, and a server 240.

The gate management device 210 is installed at an entrance of a parking lot, and manages entry and exit of a vehicle. In particular, the gate management device 210 receives a visible light signal transmitted from the vehicle entering the parking lot (more specifically, the vehicle driving assistance device) and acquires an ID of the entered vehicle from the received visible light signal.

Then, the gate management device 210 confirms whether the acquired vehicle ID is an already registered ID, and authenticates the acquired vehicle ID.

In addition, the gate management device 210 permits entry of the vehicle when the authentication of the identification ID is normally performed, and restricts entry of the vehicle when the authentication is performed abnormally.

For this, the gate management device 210 includes a parking ticket issuing unit 211, a camera unit 212, a visible light communication unit 213, an automatic barricade 214 and an information output unit 215.

The parking ticket issuing unit 211 issues a parking ticket for permitting entry of an unregistered vehicle into the parking lot. The parking ticket issuing unit 211 is provided for passing of a gate of a vehicle not equipped with a visible light communication function or a vehicle in which an identification ID is not registered in the server 240.

The camera unit 212 is selectively provided in the gate management device 210 and is provided for enhancing reliability of the vehicle authentication via the visible light communication unit 213.

The camera unit 212 captures a vehicle entering the gate, and acquires the identification ID from the captured image. Here, the identification ID acquired via the camera unit 212 may be a vehicle number recognized from the license plate included in the captured image.

The visible light communication unit 213 receives the visible light output from the visible light communication module 150 of the vehicle 700 and acquires an identification ID loaded in the received visible light.

The automatic barricade 214 is provided for permitting vehicle entry into the gate or restricting entry of the vehicle.

The information output unit 215 outputs various information according to a vehicle authentication result. For example, the information output unit 215 may output the authentication result information according to the authentication result of the identification ID. In addition, the information output unit 215 may output information on precautions in the parking lot. Further, the information output unit 215 may output the ID of the authenticated vehicle.

Referring to FIG. 9, the first lighting device 220 in the parking lot is installed on a traveling path of the vehicle 700, and guides the traveling of the vehicle. The first lighting device 220 may simply be a light source emitting light. In addition, the first lighting device 220 may be a lighting device in which a visible light communication function is provided. Preferably, the first lighting device 220 may be a lighting in which a visible light communication function is provided.

The first lighting device 220 in the parking lot may be installed in a ceiling of a traveling path on which a vehicle may travel.

The first lighting device 220 may be selectively turned on and off to guide the parking location of the vehicle 700 in the parking lot. For example, when the planned parking location of the vehicle 700 having entered the gate is set, the first lighting device 220 existing on the moving path between the current location of the vehicle and the planned parking location is turned on, and the first lighting device 220 disposed at a location deviated from the moving path may be turned off.

Further, the first lighting device 220 receives a visible light signal from the vehicle 700 passing the corresponding installation location, and transmits the received visible light signal to the server 240. Here, when the visible light signal is received, the first lighting device 220 may detect the intensity of the received visible light signal and transmit the detected intensity of the visible light signal to the server 240.

Referring to FIG. 10, the second lighting device 230 in the parking lot is installed in each individual parking zone, and manages the parked vehicle in each individual parking zone.

In particular, the second lighting device 230 acquires information of the parked vehicle 700 in the corresponding parking zone, and periodically transmits information about the vehicle to the server 240. That is, the second lighting device 230 periodically acquires information on whether the vehicle is parked, the parking time of the vehicle, and the abnormality of the parked vehicle, and transmits the acquired information to the server 240.

At this point, the second lighting device 230 may selectively receive only a visible light signal of a predetermined intensity or higher to receive only the visible light signal transmitted from the vehicle existing in the corresponding parking zone.

The server 240 controls the gate management device 210, the first lighting device 220 and the second lighting device 230 and controls the parking of the vehicle 700 using information transmitted from the gate management device 210, the first lighting device 220 and the second lighting device 230.

In particular, the server 240 performs authentication of the vehicle 700 that desires to enter the gate based on the identification ID acquired via the gate management device 210, and determines whether the vehicle 700 is permitted to enter according to the authentication result.

In addition, the server 240 guides the traveling of the vehicle 700 to the parking designated space when the parking designated space of the vehicle 700 having entered the gate of the gate management device 210 exists. That is, the server 240 confirms at least one first lighting device 220 existing in the moving line of the vehicle 700 among a plurality of first lighting devices 220 and allows only the confirmed first lighting device 220 to be turned on.

Further, when the designated parking space of the vehicle 700 does not exist, the server 240 receives setting of the planned parking location of the vehicle 700 and guides the traveling of the vehicle to the set planned parking location.

Furthermore, when reservation information on a visiting vehicle is received from the vehicle 700, the server 240 determines whether to allow entry of a gate of the next unregistered vehicle using the reservation information.

When the vehicle 700 is parked in a specific parking zone, the server 240 periodically receives the parking status information of the vehicle 700 via the second lighting device 230 installed in the specific parking zone in which the vehicle is parked and transmits the received parking status information to the outside.

At this point, the server 240 may transmit the parking status information to a pre-registered mobile terminal with respect to the vehicle 700. In addition, the server 240 may transmit the parking status information to a pre-registered smart home device 300 with respect to the vehicle 700.

In addition, when the vehicle 700 enters the gate, the server 240 may transmit the information of the entered vehicle to the pre-registered smart home device 300 with respect to the vehicle 700.

According to an embodiment of the present invention, the information of the vehicle is acquired via the lamp provided with the visible light communication function provided in the vehicle and the parking management of the vehicle is performed, so that a sensor or wire cable for vehicle parking control is unnecessary, and accordingly, installation and maintenance is easy, and thus more efficient parking management is possible.

Further, according to an embodiment of the present invention, the lighting included in the moving line to the designated parking zone or the selected parking zone of the entering vehicle may be sequentially driven so that parking guidance of the vehicle may be performed more efficiently, and thus user satisfaction can be improved.

Furthermore, the information on the unregistered vehicle is provided to the parking control device using the lamp provided in the registered vehicle, and thus visit reservation for the visiting vehicle can be performed more easily.

In addition, according to an embodiment of the present invention, the vehicle parking status information in each individual parking zone is acquired via the visible light communication module installed in the individual parking zone and provided to the user, so that the user may efficiently manage the parking location and the parking time of the vehicle and the vehicle abnormality status information, and thus the user satisfaction can be improved.

Further, according to an embodiment of the present invention, visible light communication data output from a lamp of a vehicle may be received, and lighting corresponding to the location of the vehicle may be driven based on the received signal intensity of the received visible light communication data, so that the location of the vehicle may be tracked without a separate sensor, and thus energy consumption can be reduced by driving only the lighting disposed at the current location of the vehicle.

Furthermore, according to an embodiment of the present invention, the moving line information of the vehicle in the parking lot may be stored by using the visible light communication data output from the lamp of the vehicle, and thus various situations which may occur in the parking lot can be prepared by utilizing the moving line information later.

Hereinafter, the parking control system will be described in more detail with reference to FIGS. 11 to 20.

FIGS. 11 to 20 are views for explaining an operating method of a parking control system according to an embodiment of the present invention.

Referring to FIG. 11, the vehicle driving assistance device and the parking control device 200 exchange an identification ID with each other and accordingly, the ID of the vehicle 700 in which the vehicle driving assistance device is installed is transmitted to the parking control device 200 in step 110.

In addition, when the vehicle 700 is detected to enter the gate in step 120, the vehicle driving assistance device 100 activates the visible light communication module 150 so that the visible light signal for the pre-registered identification ID is output via the activated visible light communication module 150 in step 130.

The parking control device 200 receives the visible light signal transmitted via the visible light communication module 150 of the vehicle driving assistance device 100 and acquires the identification ID by demodulating the received visible light signal in step 140.

Thereafter, the parking control device 200 performs authentication of the acquired identification ID, and confirms whether the identification ID is the pre-registered ID or the unregistered ID in step 150.

Further, the parking control device 200 determines whether authentication of the identification ID is normally performed according to an authentication result of the identification ID in step 160.

Thereafter, when the authentication of the identification ID is normally performed, the parking control device 200 permits entry of the vehicle 700 in step 170.

Meanwhile, the vehicle driving assistance device 100 of the vehicle 700 may transmit not only its own identification ID but also the ID of other vehicle to the parking control device 200. That is, the vehicle driving assistance device 100 of the vehicle 700 may transmit the identification ID of the visiting vehicle to the parking control device 200, in order to reserve the visiting vehicle.

That is, referring to FIG. 12, when the vehicle 700 in which the vehicle driving assistance device 100 is installed enters the gate in step 210, the visible light communication module 150 of the vehicle driving assistance device 100 transmits a reservation signal for reserving the visiting vehicle to the parking control device 200 in step 220. At this point, the reservation signal may be transmitted to the parking control device 200 via the visible light communication module 150 of the vehicle driving assistance device 100, and alternatively, may be transmitted to the parking control device 200 via the communication unit 120.

Then, the vehicle driving assistance device 100 outputs a visible light signal including a visit identification ID for reservation of the visiting vehicle via the visible light communication module 150 in step 230.

In addition, the vehicle driving assistance device 100 receives the reservation result information of the visiting vehicle according to the visible light signal output from the parking control device 200 in step 240.

Meanwhile, in order to prevent illegal parking using the ID of other vehicle, the parking control device 200 may perform authentication of a vehicle entering the gate management device 210 using the camera unit 212 and the visible light communication unit 213.

Referring to FIG. 13, the parking control device 200 receives a visible light signal transmitted from the visible light communication module 150 of the vehicle 700 in step 310.

In addition, the parking control device 200 acquires a first identification ID included in the visible light signal using the received visible light signal in step 320.

Further, the parking control device 200 acquires a second identification ID for the entered vehicle via the camera unit 212 in step 330.

Furthermore, the parking control device 200 compares the acquired first identification ID with the second identification ID in step 340.

Thereafter, when the first identification ID and the second identification ID are equal to each other, the parking control device 200 permits entry of the vehicle 700.

Meanwhile, the parking control device 200 may guide the parking location of the vehicle 700 entering the parking lot.

Referring to FIG. 14, the parking control device 200 detects entry of the vehicle 700 into the parking lot in step 410.

In addition, the parking control device 200 determines whether there is a designated space for the entered vehicle in step 420.

Thereafter, when there is no designated space for the vehicle, the parking control device 200 transmits information on an empty parking space in the parking lot to the vehicle driving assistance device 100 of the vehicle 700 in step 430.

Further, the parking control device 200 receives information on the planned parking location from the vehicle driving assistance device 100 in step 440.

Thereafter, when the planned parking location is received, the parking control device 200 confirms a plurality of first lighting devices 220 existing in the moving line between the current location of the vehicle and the planned parking location, and sequentially drives the confirmed first lighting devices 220 in step 450.

In addition, when there is a designated space of the vehicle 700, the parking control device 200 confirms a plurality of first lighting devices 220 existing in the moving line between the current location of the vehicle and the designated space, and sequentially drives the confirmed first lighting devices 220 in step 460.

That is, referring to FIG. 15, a plurality of first lighting devices 220 are disposed in a traveling path of a parking lot. Further, when a location at which the vehicle 700 is to be parked (designated space or preset parking location, G25 in the figure) is determined, the parking control device 200 confirms a plurality of first lighting devices 220 existing in the moving line between the determined location and the current location of the vehicle.

Furthermore, the parking control device 200 turns on the first lighting device 222 disposed in the moving line of the plurality of first lighting devices 220 and turns off the first lighting device 221 disposed to be deviated from the moving line thereof.

Meanwhile, when the entry of the vehicle into the parking lot is detected, the parking control device 200 may transmit the entry information of the vehicle 700 to an external device linked to the entered vehicle. Here, the external device may be a mobile terminal linked to the vehicle 700, and alternatively, may be a smart home device 300.

Referring to FIG. 16, when the entry of the vehicle 700 into the parking lot is detected, the parking control device 200 confirms the external device linked to the identification ID, that is, the smart home device 300, using the ID of the entered vehicle 700 in step 520.

In addition, when the smart home device 300 is confirmed, the parking control device 200 transmits entry notification information of the entered vehicle 700 to the confirmed smart home device 300 in step 530.

That is, referring to FIG. 17, as shown in drawing (A), the entry notification information may be information notifying that the vehicle 700 registered in association with the corresponding smart home device (for example, the device installed in the number 502) has passed the entrance gate.

As shown in FIG. 17 (B), the entry notification information may be information notifying that the vehicle that had made a visit reservation in a residence (for example, a vehicle B that had made a visit reservation at number 502) has passed the entrance gate.

Meanwhile, the parking control device 200 may store information on the actual moving line of the vehicle 700 traveling in the parking lot, and may utilize the stored information in various manners later.

For this, the plurality of first lighting devices 220 constituting the parking control device 200 respectively receive the visible light signal transmitted from the vehicle 700, and transmit reception status information of the received visible light signals to the server 240 in step 610.

The server 240 confirms the reception intensity of the received visible light signal using the reception status information of the received visible light signal in step 620.

Next, the server 240 confirms the actual moving line of the vehicle 700 using the reception intensity of the confirmed visible light signal in step 630. That is, the intensity of the visible light signal received by the first lighting device 220 disposed closest to the current location of the vehicle 700 among the plurality of first lighting devices 220 will be the highest. Accordingly, the server 240 may confirm the actual moving line of the vehicle 700 using the location of the first lighting device 220 receiving the visible light signal of the highest reception intensity.

In addition, the server 240 stores the information on the confirmed actual moving line of the vehicle 700 in step 640.

Meanwhile, the parking control device 200 of the present invention may acquire status information of the parked vehicle in the individual parking zone using the second lighting device 230 and may transmit the acquired status information of the vehicle to the user mobile terminal or smart home device 300.

That is, referring to FIG. 19, the parking control device 200 may receive a visible light signal transmitted from the vehicle installed in the corresponding parking zone via the second lighting device 230 installed in each individual zone in step 710.

Thereafter, the second lighting device 230 acquires the status information of the parked vehicle in the corresponding parking zone using the received visible light signal in step 720. That is, the second lighting device 230 may receive the visible light signal from the vehicle parked in the corresponding parking zone, and may obtain information on presence of the parked vehicle, a parking time, and abnormality of the vehicle by using the received visible light signal.

Further, the server 240 receives the acquired status information from the second lighting device 230 and transmits the received status information to the user mobile terminal or the smart home device 300 in step 730.

That is, the transmitted status information may be parking location information on the parking location of the vehicle 700, as shown in FIG. 20 (A).

In addition, the transmitted status information may include parking time information of the vehicle 700 and parking fee information according to the parking time, as shown in FIG. 20 (B).

FIG. 21 is an example of an internal block diagram of the vehicle of FIG. 2.

Such a vehicle assistance device 100 may be included in the vehicle.

The vehicle includes a communication unit 710, an input unit 720, a sensing unit 760, an output unit 740, a vehicle drive unit 750, a memory 730, an interface unit 780, a control unit 770, a power supply unit 790, a vehicle assistance device 100, and an AVN device 400.

The communication unit 710 may include one or more modules that enable wireless communication between a vehicle 700 and a mobile terminal 600, between the vehicle 700 and an external server 510, or between the vehicle 700 and another vehicle 510. In addition, the communication unit 710 may include one or more modules that connect the vehicle to one or more networks.

The communication unit 710 may include a broadcast receiving module 711, a wireless Internet module 712, a short-range communication module 713, a location information module 714 and an optical communication module 715.

The broadcast receiving module 711 receives broadcast signals or broadcast-associated information from an external broadcast control server through a broadcast channel. Here, the broadcast includes a radio broadcast or a TV broadcast.

The wireless Internet module 712 may refer to a module for wireless Internet access, and may be built in or externally built in a vehicle. The wireless Internet module 712 is configured to transmit and receive wireless signals in a communication network according to wireless Internet technologies.

Such wireless Internet technologies include, for example, Wireless LAN (WLAN), Wireless-Fidelity (Wi-Fi), Wireless Fidelity (Wi-Fi) Direct, Digital Living Network Alliance (DLNA), Wireless Broadband (WiBro), World Interoperability for Microwave Access (WIMAX), High Speed Downlink Packet Access (HSDPA), High Speed Uplink Packet Access (HSUPA), Long Term Evolution (LTE), Long Term Evolution-Advanced (LTE-A), and the like, and the wireless Internet module 712 transmits and receives data according to at least one wireless Internet technology in a range including Internet technologies not listed above. For example, the wireless Internet module 712 may exchange data with the external server 510 wirelessly. The wireless Internet module 712 may receive weather information and road traffic situation information (for example, Transport Protocol Expert Group (TPEG)) from the external server 510.

The short-range communication module 713 is configured to facilitate short-range communication, and may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct and Wireless Universal Serial Bus (USB) technology.

The short-range communication module 713 may form short-range wireless communication networks (Wireless Area Networks) to perform short-range communication between the vehicle and at least one external device. For example, the short-range communication module 713 may exchange data with the mobile terminal 600 wirelessly. The short-range communication module 713 may receive weather information and traffic situation information of the road (for example, TPEG (Transport Protocol Expert Group)) from the mobile terminal 600. For example, when a user has boarded the vehicle, the user mobile terminal 600 and the vehicle may pair with each other automatically or by executing the user's application.

The location information module 714 is a module for acquiring a location of the vehicle, and a representative example thereof is a Global Positioning System (GPS) module. For example, when the vehicle utilizes a GPS module, the vehicle may acquire the location of the vehicle by using a signal transmitted from a GPS satellite.

The optical communication module 715 may include a light emitting unit and a light reception unit.

The light reception unit may convert a light signal into an electric signal and receive information. The light reception unit may include a photo diode (PD) configured to receive light. The PD may convert light into electric signals. For example, the light reception unit may receive information of a preceding vehicle via the light emitted from a light source included in the preceding vehicle.

The light emitting unit may include at least one light emitting element for converting an electric signal into an optical signal. Here, the light emitting element is preferably a light emitting diode (LED). The light emitting unit converts the electric signal into the optical signal to transmit to the outside. For example, the light emitting unit may emit the optical signal to the outside via the blinking of the light emitting element corresponding to a predetermined frequency. According to an embodiment, the light emitting unit may include a plurality of light emitting element arrays. According to an embodiment, the light emitting unit may be integrated with a lamp provided in the vehicle. For example, the light emitting unit may be at least one of a headlight, a tail lamp, a stop lamp, a turn signal lamp, and a side marker lamp. For example, the optical communication module 715 may exchange data with other vehicle 520 via optical communication.

The input unit 720 may include a driving operation unit 721, a camera 195, a microphone 723, and a user input unit 724.

The driving operation unit 721 receives a user input for driving the vehicle. The driving operation unit 721 may include a steering input unit 721A, a shift input unit 721D, an acceleration input unit 721C, and a brake input unit 721B (refer to the description of FIG. 2).

The steering input unit 721A receives an input of a traveling direction of the vehicle from the user. It is preferable that the steering input unit 721A is formed in a wheel form so that steering input may be performed by rotation. According to an embodiment, the steering input unit 721A may be formed as a touch screen, a touch pad, or a button.

The shift input unit 721D receives inputs of parking (P), advance neutral (N), and reverse (R) of the vehicle from the user. It is preferable that the shift input unit 721D is formed in a lever form. According to an embodiment, the shift input unit 721D may be formed as a touch screen, a touch pad or a button.

The acceleration input unit 721C receives an input for acceleration of the vehicle from the user. The brake input unit 721B receives an input for decelerating the vehicle from the user. It is preferable that the acceleration input unit 721C and the brake input unit 721B are formed in a pedal form. According to an embodiment, the acceleration input unit 721C or the brake input unit 721B may be formed as a touch screen, a touch pad, or a button.

The camera 722 may include an image sensor and an image processing module. The camera 722 may process a still image or a moving image acquired by the image sensor (e.g., CMOS or CCD). In addition, the image processing module processes the still image or moving image acquired via the image sensor, extracts necessary information, and delivers the extracted information to the control unit 770. Meanwhile, the vehicle may include a camera 722 configured to capture an image in front of or around the vehicle, and a monitoring unit configured to capture an inside image of the vehicle.

The monitoring unit may acquire an image of a passenger. The monitoring unit may acquire an image for biometrics of the passenger.

Meanwhile, in FIG. 21, although it is shown that the monitoring unit and the camera 722 are included in the input unit 720, the camera 722 may be described as a configuration included in the vehicle assistance device, as described above.

The microphone 723 may process an external sound signal into electrical data. The processed data may be used variously depending on a function performed in the vehicle. The microphone 723 may convert a voice command of the user into electrical data. The converted electrical data may be transmitted to the control unit 770.

Meanwhile, according to an embodiment, the camera 722 or the microphone 723 may be a component included in the sensing unit 760, not a component included in the input unit 720.

The user input unit 724 is configured to receive information from a user. When information is input via the user input unit 724, the control unit 770 may control the operation of the vehicle to correspond to the input information. The user input unit 724 may include a touch input unit or mechanical input unit. According to an embodiment, the user input unit 724 may be disposed at one region of the steering wheel. In this case, the driver may operate the user input unit 724 with the driver's finger while holding the steering wheel.

The sensing unit 760 senses a signal associated with the traveling of the vehicle or the like. For this, the sensing unit 760 may include a collision sensor, a wheel sensor, a speed sensor, a tilt sensor, a weight sensor, a heading sensor, a yaw sensor, a gyro sensor, a position module, a vehicle advance reverse sensor, a battery sensor, a fuel sensor, a tire sensor, a steering sensor based on rotation of the steering wheel, a vehicle interior temperature sensor, a vehicle interior humidity sensor, an ultrasonic sensor, a radar, a Lidar, and the like.

As such, the sensing unit 760 may acquire sensing signals with regard to vehicle collision information, vehicle traveling direction information, vehicle location information (GPS information), vehicle angle information, vehicle speed information, vehicle acceleration information, vehicle tilt information, vehicle forward/reverse information, battery information, fuel information, tire information, vehicle lamp information, vehicle interior temperature information, vehicle interior humidity information, steering wheel rotation angle, and the like.

Meanwhile, in addition to this, the sensing unit 760 may further include an accelerator pedal sensor, a pressure sensor, an engine speed sensor, an air flow-rate sensor (AFS), an air temperature sensor (ATS), a water temperature sensor (WTS), a throttle position sensor (TPS), a top dead center (TDC) sensor, a crank angle sensor (CAS) and the like.

The sensing unit 760 may include a biometric information sensing unit. The biometric information sensing unit senses and acquires biometric information of a passenger. The biometric information may include fingerprint information, iris-scan information, retina-scan information, hand geo-metry information, facial recognition information, and voice recognition information. The biometric information sensing unit may include a sensor for sensing the biometric information of the passenger. Here, the monitoring unit and the microphone 723 may operate as sensors. The biometric information sensing unit may acquire the hand geo-metry information and the facial recognition information via the monitoring unit.

The output unit 740 is configured to output information processed at the control unit 770 and may include a display unit 741, a sound output unit 742, and a haptic output unit 743.

The display unit 741 may display information processed at the control unit 770. For example, the display unit 741 may display vehicle-associated information. Here, the vehicle-associated information may include vehicle control information for direct control of the vehicle, or vehicle driving assistance information for a driving guide to a vehicle driver. In addition, the vehicle-associated information may include vehicle status information notifying the current status of the vehicle or vehicle operation information related to the operation of the vehicle.

The display unit 741 may include at least one of a liquid crystal display (LCD), a thin film transistor-liquid crystal display (TFT LCD), an organic light-emitting diode (OLED), a flexible display, a 3D display, and an e-ink display.

The display unit 741 may configure an inter-layer structure with a touch sensor, or may be integrally formed with the touch sensor to implement a touch screen. Such a touch screen may function as a user input unit 724 that provides an input interface between the vehicle and the user, and simultaneously, provide an output interface between the vehicle and the user. In this case, the display unit 741 may include a touch sensor, which senses a touch to the display unit 741 to receive a control command in a touch manner. When a touch is input to the display unit 741 as described above, the touch sensor may sense the touch and the control unit 770 may generate a control command corresponding to the touch. Content input in a touch manner may be characters or numbers, or may be, for example, instructions in various modes or menu items that may be designated.

Meanwhile, the display unit 741 may include a cluster to allow the driver to check vehicle status information or vehicle traveling information while driving the vehicle. The cluster may be located on a dashboard. In this case, the driver may confirm the information displayed on the cluster while looking forward.

Meanwhile, according to an embodiment, the display unit 741 may be implemented as a head up display (HUD). When the display unit 741 is implemented as an HUD, information may be output via a transparent display provided at a windshield. Alternatively, the display unit 741 may include a projector module to output information via an image projected onto the windshield.

The sound output unit 742 is configured to convert electric signals from the control unit 770 into audio signals and to output the audio signals. For this, the sound output unit 742 may include a speaker or the like. The sound output unit 742 may output sound corresponding to the operation of the user input unit 724.

The haptic output unit 743 is configured to generate a tactile output. For example, the haptic output unit 743 may operate to vibrate a steering wheel, a safety belt, or a seat to allow the user to recognize an output thereof.

The vehicle drive unit 750 may control the operation of various devices of the vehicle. The vehicle drive unit 750 may include a power source drive unit 751, a steering drive unit 752, a brake drive unit 753, a lamp drive unit 754, an air conditioner drive unit 755, a window drive unit 756, an airbag drive unit 757, a sunroof drive unit 758, and a suspension drive unit 759.

The power source drive unit 751 may perform electronic control of the power source inside the vehicle.

For example, when a fossil fuel-based engine (not shown) is a power source, the power source drive unit 751 may perform electronic control of the engine. Accordingly, the power source drive unit 751 may control an output torque or the like of the engine. When the power source drive unit 751 is an engine, the power source drive unit 751 may control the speed of the vehicle by controlling the output torque of the engine under the control of the control unit 770.

As another example, when an electric motor (not shown) is a power source, the power source drive unit 751 may perform control of the motor. Accordingly, the power source drive unit 751 may control a rotation speed, torque or the like of the motor.

The steering drive unit 752 may perform electronic control of a steering apparatus inside the vehicle. Accordingly, the steering drive unit 752 may change the traveling direction of the vehicle.

The brake drive unit 753 may perform electronic control of a brake apparatus (not shown) inside the vehicle. For example, the brake drive unit 753 may reduce the speed of the vehicle by controlling the operation of brakes located at wheels. As another example, the brake drive unit 753 may adjust the traveling direction of the vehicle leftward or rightward by differentiating the operation of respective brakes located at left and right wheels.

The lamp drive unit 754 may control turn on/off of a lamp disposed inside or outside the vehicle. In addition, the lamp drive unit 754 may control the intensity, direction, and the like of light of the lamp. For example, the lamp drive unit 754 may perform control of a turn signal lamp or a brake lamp.

The air conditioner drive unit 755 may perform electronic control of an air conditioner (not shown) inside the vehicle. For example, when the interior temperature of the vehicle is high, the air conditioner drive unit 755 may operate the air conditioner to supply cold air to the interior of the vehicle.

The window drive unit 756 may perform electronic control of a window apparatus inside the vehicle. For example, the window drive unit 756 may control opening or closing of left and right windows of the vehicle.

The airbag drive unit 757 may perform electronic control of an airbag apparatus inside the vehicle. For example, the airbag drive unit 757 may control an airbag to blow off at risk.

The sunroof drive unit 758 may perform electronic control of a sunroof apparatus (not shown) in the vehicle. For example, the sunroof drive unit 758 may control opening or closing of a sunroof.

The suspension drive unit 759 may perform electronic control of a suspension apparatus (not shown) inside the vehicle. For example, when a road surface is uneven, the suspension drive unit 759 may control the suspension device to reduce vibrations of the vehicle.

The memory 730 is electrically connected to the control unit 770. The memory 730 may store basic data on a unit, control data for operation control of the unit and input/output data. The memory 730 may be various storage devices, which are implemented in a hardware manner, such as a ROM, RAM, EPROM, flash drive and hard drive. The memory 730 may store a variety of data for overall operation of the vehicle, such as a program for processing or control of the control unit 770.

The interface unit 780 may serve as a passage for various kinds of external devices that are connected to the vehicle. For example, the interface unit 780 may have a port that is connectable to the mobile terminal 600 and may be connected to the mobile terminal 600 via the port. In this case, the interface unit 780 may exchange data with the mobile terminal 600.

Meanwhile, the interface unit 780 may serve as a passage for providing electric energy to the connected mobile terminal 600. When the mobile terminal 600 is electrically connected to the interface unit 780, the interface unit 780 may provide electric energy supplied from the power supply unit 790 to the mobile terminal 600 under control of the control unit 770.

The control unit 770 may control the overall operation of each unit inside the vehicle. The control unit 770 may be referred to as an electronic control unit (ECU).

The control unit 770 may perform a function corresponding to a delivered signal according to delivery of a signal for executing the vehicle assistance device.

The control unit 770 may be implemented in a hardware manner using at least one selected from among application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and electric units for the implementation of other functions.

The control unit 770 may perform the role of the above-described processor 170. That is, the processor 170 of the vehicle assistance device may be directly set in the control unit 770 of the vehicle. In such an embodiment, the vehicle assistance device may be understood as a combination of some components of the vehicle.

Alternatively, the control unit 770 may control the components to transmit information requested by the processor 170.

The power supply unit 790 may supply power required to operate the respective components under the control of the control unit 770. In particular, the power supply unit 770 may receive power from, for example, a battery (not shown) inside the vehicle.

The AVN device 400 may exchange data with the control unit 770. The control unit 770 may receive navigation information from the AVN device 400 or a separate navigation device. Here, the navigation information may include set destination information, information on a path to the destination, map information related to vehicle traveling or location information of the vehicle.

The characteristics, structures and effects described in the embodiments above are included in at least one embodiment but are not limited to one embodiment. Furthermore, the characteristic, structure, and effect illustrated in each embodiment may be combined or modified for other embodiments by a person skilled in the art. Thus, it should be construed that contents related to such a combination and such a modification are included in the scope of the present invention.

Further, embodiments are mostly described above. However, they are only examples and do not limit the present invention. One of ordinary skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the present invention defined in the following claims.

The invention claimed is:

1. A parking control system, comprising:
a vehicle driving assistance device, which is provided in a vehicle, stores a vehicle identification ID of the vehicle, and outputs a visible light signal including the stored identification ID; and
a parking control device including a server receiving a visible light signal transmitted via the vehicle driving assistance device, acquiring an identification ID included in the received visible light signal, and determining whether to permit entry of the vehicle according to an authentication result of the acquired identification ID,
wherein the server, when the authentication of the identification ID is successfully performed, confirms a planned parking location of the vehicle, and outputs guide information such that the vehicle is moved to the confirmed planned parking location,
wherein the vehicle driving assistance device comprises:
a first visible light communication unit outputting the identification ID through visible light,
wherein the first visible light communication unit maintains an inactive status until the vehicle approaches a parking entrance gate for a parking lot,
wherein the first visible light communication unit is activated when the vehicle approaches the parking entrance gate, and
wherein the server confirms a smart home device associated with the vehicle based on an identification ID of the vehicle when the vehicle enters, and transmits entry notification information of the vehicle to the smart home device, the smart home device being disposed at a remote location external to the vehicle and external to the parking lot,
wherein the parking control device includes a plurality of first lighting devices installed in a traveling path of a vehicle in a parking lot, and when the planned parking location is set, the server sequentially drives at least one first lighting device disposed in a moving line between the current location of the vehicle and the planned parking location,
wherein the vehicle driving assistance device, when the identification ID is authenticated, outputs a visible light signal for acquiring status information of the vehicle at every predetermined period of time,
wherein the plurality of first lighting devices receive a visible light signal transmitted from the vehicle driving assistance device and transmit strength information of the received visible light signal to the server, and wherein the server acquires actual moving line information on the vehicle by using the strength information transmitted from the plurality of first lighting devices, and drives a first lighting device disposed on an actual moving line of the vehicle based on the strength information.

2. The parking control system of claim 1, wherein when an designated parking space of the vehicle is present, the server sets the designated parking space to the planned parking location, and when the designated parking space is not present, the server transmits parking space information on an empty parking space at the present time to the vehicle driving assistance device, and sets parking location information received based on the transmitted parking space information to the planned parking location of the vehicle.

3. The parking control system of claim 1, wherein the parking control device further comprises:
a second visible light communication unit installed at the entrance gate and receiving a visible light signal transmitted via the vehicle driving assistance device to acquire an identification ID; and
a camera installed at the entrance gate and photographing a vehicle entering the entrance gate to acquire a vehicle ID,
wherein the server compares the identification ID with the vehicle ID and determines whether to allow the vehicle to enter the gate based on the comparison result.

4. The parking control system of claim 1, wherein the parking control device receives a visible light signal including a vehicle ID of a visiting vehicle via the vehicle driving assistance device, and registers a visit reservation of the visiting vehicle by acquiring the vehicle ID from the received visible light signal.

5. The parking control system of claim 1, wherein the parking control device further includes a plurality of second lighting devices respectively installed in an individual parking zone and receiving a visible light signal transmitted from a vehicle parked in the individual parking zone to acquire status information of the parked vehicle.

6. The parking control system of claim 5, wherein the server receives status information transmitted from the plurality of second lighting devices, and transmits the received status information to a pre-registered mobile terminal and a smart home device, and the status information includes at least one of parking location information, parking time information, and parking fee information.

7. The parking control system of claim 1, wherein when a vehicle registration signal is received from the vehicle driving assistance device, the server requests registration information for vehicle registration from the vehicle driving assistance device, and receives a visible light signal including the registration information from the vehicle driving assistance device to perform vehicle registration, wherein the registration information includes at least one of an identification ID of a vehicle, generation information of the vehicle, mobile terminal information associated with the vehicle, and smart home device information associated with the vehicle.

8. A parking control system, comprising:
a vehicle driving assistance device, which is provided in a vehicle, stores a vehicle identification ID of the vehicle, and outputs a visible light signal including the stored identification ID; and
a parking control device including a server receiving a visible light signal transmitted via the vehicle driving assistance device, acquiring an identification ID included in the received visible light signal, and determining whether to permit entry of the vehicle according to an authentication result of the acquired identification ID,
wherein the server, when the authentication of the identification ID is successfully performed, confirms a planned parking location of the vehicle, and outputs guide information such that the vehicle is moved to the confirmed planned parking location,
wherein the vehicle driving assistance device comprises:
a first visible light communication unit outputting the identification ID through visible light,
wherein the first visible light communication unit maintains an inactive status until the vehicle approaches a parking entrance gate,
wherein the first visible light communication unit is activated when the vehicle approaches the parking entrance gate,
wherein the vehicle driving assistance device, when the identification ID is authenticated, outputs a visible light signal for acquiring status information of the vehicle at every predetermined period of time,
wherein the plurality of first lighting devices receive a visible light signal transmitted from the vehicle driving assistance device and transmit strength information of the received visible light signal to the server, and
wherein the server acquires actual moving line information on the vehicle by using the strength information transmitted from the plurality of first lighting devices, and drives a first lighting device disposed on an actual moving line of the vehicle based on the strength information.

* * * * *